United States Patent
Kobana

(10) Patent No.: US 12,212,720 B2
(45) Date of Patent: Jan. 28, 2025

(54) IMAGE PROCESSING APPARATUS AND CONTROL METHOD OF THE IMAGE PROCESSING APPARATUS

(71) Applicant: CANON KABUSHIKI KAISHA, Tokyo (JP)

(72) Inventor: Yusuke Kobana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/466,421

(22) Filed: Sep. 13, 2023

(65) Prior Publication Data
US 2024/0106937 A1    Mar. 28, 2024

(30) Foreign Application Priority Data
Sep. 26, 2022    (JP) .................... 2022-153144

(51) Int. Cl.
*H04N 1/00*    (2006.01)

(52) U.S. Cl.
CPC ....... *H04N 1/00079* (2013.01); *H04N 1/0001* (2013.01); *H04N 1/00018* (2013.01); *H04N 1/00037* (2013.01); *H04N 1/0009* (2013.01); *H04N 1/00209* (2013.01); *H04N 1/00244* (2013.01); *H04N 1/0048* (2013.01)

(58) Field of Classification Search
None
See application file for complete search history.

(56) References Cited

U.S. PATENT DOCUMENTS

| | | | | |
|---|---|---|---|---|
| 2007/0121148 A1* | 5/2007 | Sugimoto | .......... | H04N 1/00222 358/1.15 |
| 2009/0244615 A1* | 10/2009 | Mizumukai | ............ | H04N 1/444 358/1.15 |
| 2015/0205548 A1* | 7/2015 | Suzuki | .................. | G06F 3/1288 358/1.14 |

(Continued)

FOREIGN PATENT DOCUMENTS

| | | | | |
|---|---|---|---|---|
| JP | H1023197 | * | 1/1998 | ............... H04N 1/00 |
| JP | 2002171219 | * | 6/2002 | ............... H04N 1/00 |

(Continued)

*Primary Examiner* — Beniyam Menberu
(74) *Attorney, Agent, or Firm* — ROSSI, KIMMS & McDOWELL LLP

(57) ABSTRACT

A reservation scan control unit of an MFP including a storage device and a scanner unit has a confirmation unit that confirms whether or not a file including an image generated by scan processing executed by the scanner unit can be transmitted to a transmission destination specified by a client terminal, a notification unit that provides a notification about a confirmation result to the client terminal in response to a confirmation that transmission to a transmission destination is not possible, which is a confirmation result, and a storage unit that stores a job including a setting of the scan processing and the transmission destination of a file including an image generated by the scan processing in the storage device, and the reservation scan control unit provides a notification about identification information corresponding to the job to the client terminal based on a confirmation that transmission to the transmission destination is possible, which is a confirmation result.

9 Claims, 25 Drawing Sheets

(56) References Cited

U.S. PATENT DOCUMENTS

| | | | |
|---|---|---|---|
| 2016/0173728 A1* | 6/2016 | Kasuya | H04N 1/00281 358/1.14 |
| 2016/0219183 A1* | 7/2016 | Ochi | H04N 1/32096 |
| 2020/0099819 A1* | 3/2020 | Shiraki | H04N 1/32797 |
| 2021/0096800 A1* | 4/2021 | Sato | G06F 3/1271 |

FOREIGN PATENT DOCUMENTS

| | | | | |
|---|---|---|---|---|
| JP | 2004252542 | * | 9/2004 | H04N 1/00 |
| JP | 2004297680 | * | 10/2004 | H04N 1/00 |
| JP | 2005064762 A | | 3/2005 | |
| JP | 2007336399 | * | 12/2007 | H04N 1/00 |
| JP | 2010219920 | * | 9/2010 | H04N 1/00 |
| JP | 2021190834 | * | 12/2021 | H04N 1/00 |

\* cited by examiner

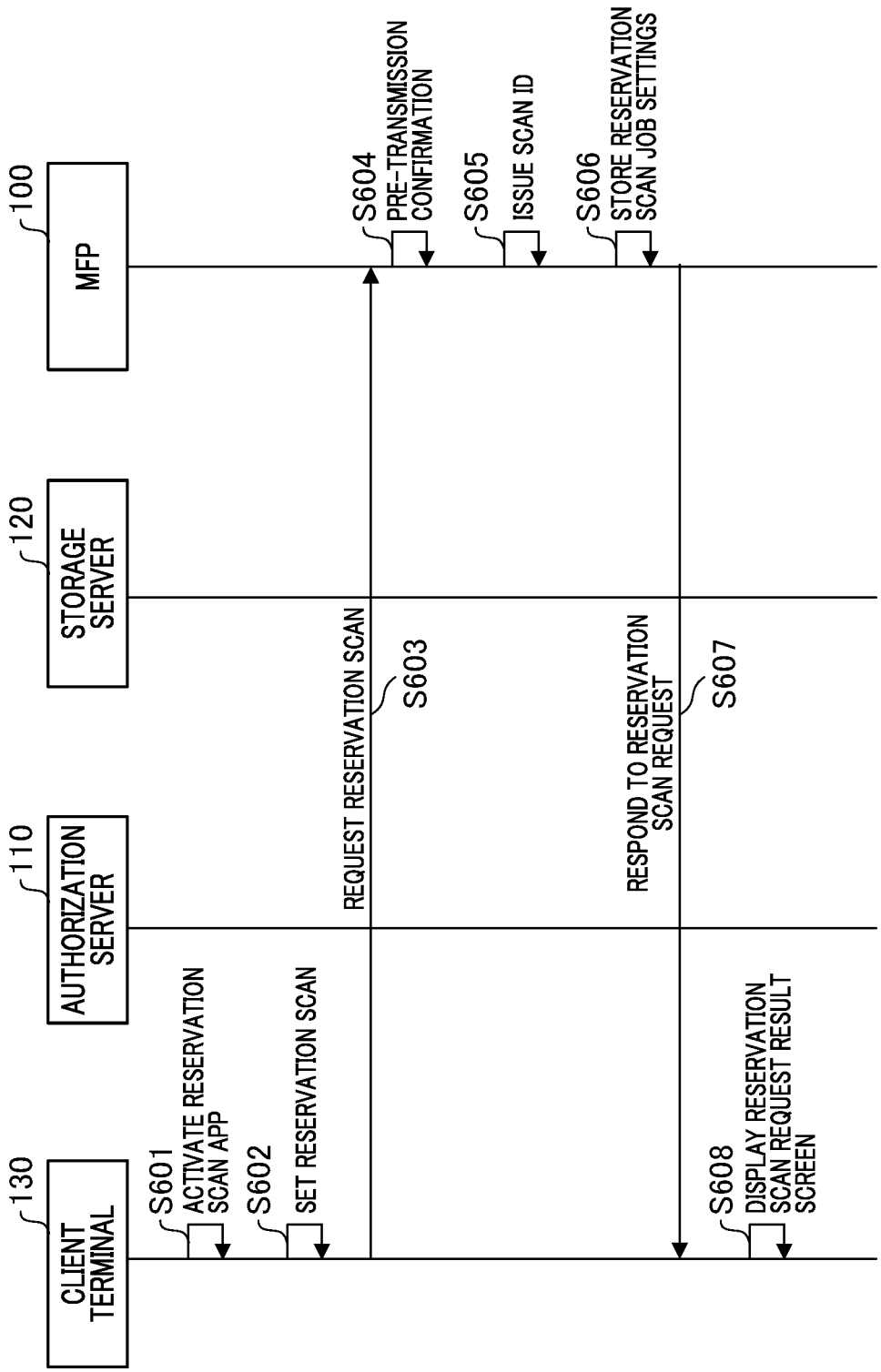

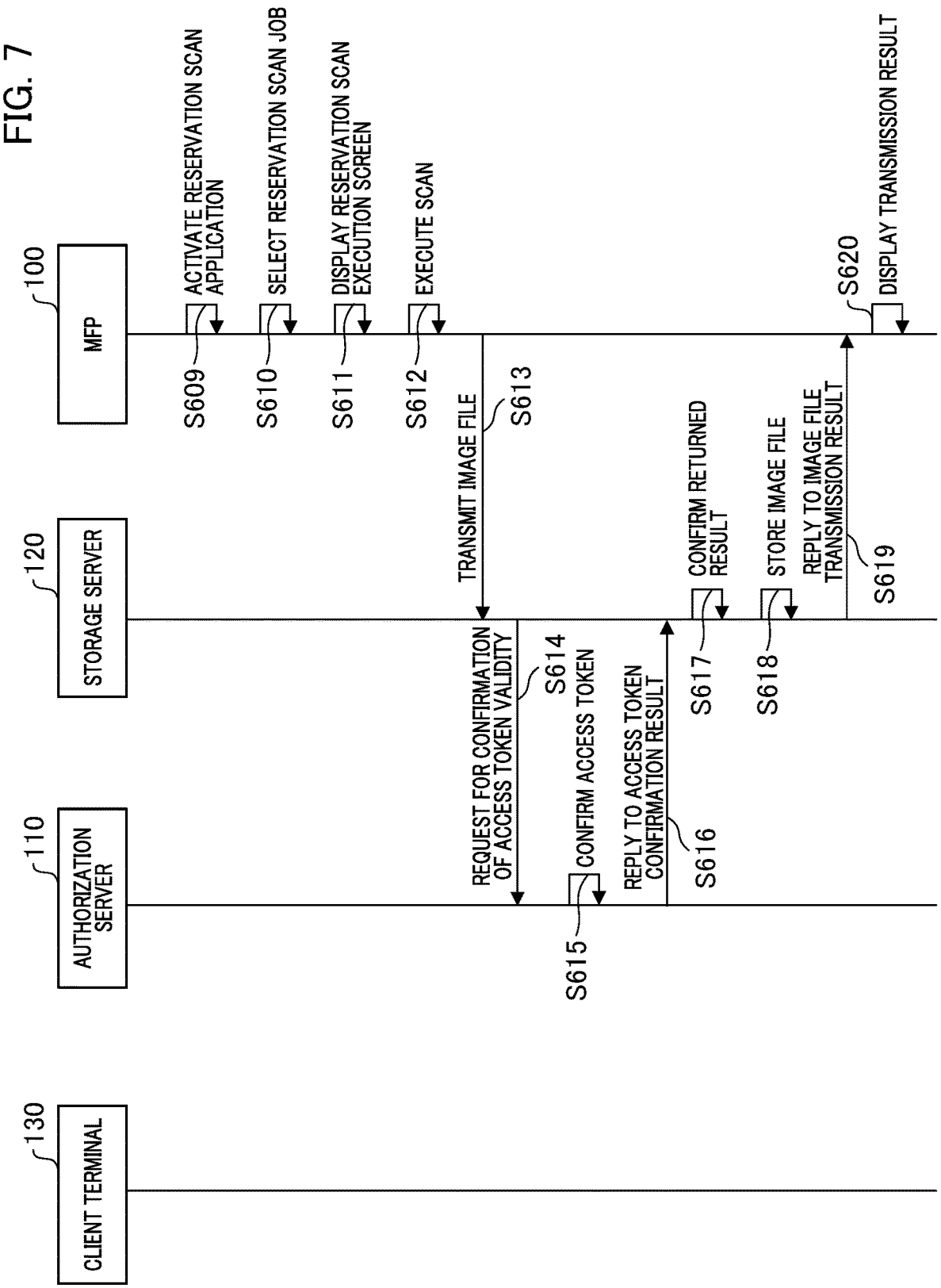

FIG. 8

```
                                                             800
                                                            /
  ┌─────────────────────────────────────────────────────────┐
  │  Reservation scan                                        │
  │                                                          │
  │ ┌Scan settings                                           │
  │ │   Reading size      │ A3           ▼│                  │
  │ │                                                        │
  │ │   Color             │ Full color   ▼│                  │
  │ │                                                        │
  │ │   File type         │ PDF          ▼│                  │
  │                                                  804     │
  │ ┌Transmission destination                         /      │
  │ │   Server    storageA                                   │
  │ │                                         ┌────────────┐ │
  │ │   Path      keiyaku¥20220501            │Select path │ │
  │ │                                         └────────────┘ │
  │ ┌Name        ┌──────────────────────────┐                │
  │ │            │ Contract scan            │                │
  │ │            └──────────────────────────┘                │
  │                                   805                    │
  │                                   /                      │
  │                          ┌─────────┐      ┌─────────┐    │
  │                          │   OK    │      │ Cancel  │    │
  │                          └─────────┘      └─────────┘    │
  └─────────────────────────────────────────────────────────┘
```

801 — Scan settings
802 — Transmission destination
803 — Name

FIG. 9

| Scan settings | Transmission destination | Name | Access token | Scan ID |
|---|---|---|---|---|
| A3、Full color、PDF | storageA(172.16.8.24) keiyaku¥202200501 | Contract scan | abcd1234xy | 1 |
| ---------- | ---------- | ---------- | ---------- | ---------- |

901　902　903　904　905

IMAGE PROCESSING APPARATUS AND CONTROL METHOD OF THE IMAGE PROCESSING APPARATUS

BACKGROUND OF THE INVENTION

Field of the Invention

The present invention relates to an image processing apparatus including a storage device and a scanner, and a control method of the image processing apparatus.

Description of the Related Art

In recent years, the number of cases in which storage servers such as a cloud are used as a transmission destination of image scanned by an image processing apparatus is increasing. Additionally, scanning in the image processing apparatus can easily be performed by generating a reservation scan job including scan settings, the transmission destination of the storage server, and authentication information for accessing the storage server in advance on the client terminal, and inputting this job into the image processing apparatus. The client terminal is a PC, a smartphone, and the like. Additionally, in the image processing apparatus, a document can be sent to a desired storage server with desired settings, simply by setting the document and executing a reservation scan job that has been input from the client terminal. When a scan job is executed by the image processing apparatus, a transmission error may occur. The causes of transmission errors include a case in which access to a storage server at the transmission destination is prohibited due to operational reasons, or a case in which access to a transmission destination cannot be possible due to incorrect network settings. Japanese Patent Application Laid-Open No. 2005-64762 discloses means for providing a notification to an external terminal when an error has been detected in a scan job.

However, if an error is notified after the scan job was executed in the reservation scan as disclosed in Japanese Patent Application Laid-Open No. 2005-64762, user actions such as a move to the image processing apparatus for the reservation scan job execution, setting of documents, and selection of a reservation scan job to be executed is useless.

SUMMARY OF THE INVENTION

The present invention suppresses the occurrence of useless work for the user caused by errors during execution of the reservation scan job.

An image processing apparatus of the present invention is an image processing apparatus including a storage device and a scanner comprising: a memory storing instructions; and a processor executing the instructions causing the image processing apparatus to: confirm whether or not a file including an image generated by scan processing executed by the scanner can be transmitted to a transmission destination specified by a client terminal; provide a notification about a confirmation result to the client terminal in response to a confirmation that transmission to the transmission destination is not possible; and store, in the storage device, a job including a setting of scan processing and a transmission destination of a file including an image generated by the scan processing, wherein the processor provides a notification about identification information corresponding to the job to the client terminal in response to a confirmation that transmission to the transmission destination is possible.

Further features of the present invention will become apparent from the following description of exemplary embodiments with reference to the attached drawings.

BRIEF DESCRIPTION OF THE DRAWINGS

FIG. 6 is a sequence diagram explaining the flow of a series of reservation scan processes in the first embodiment.

FIG. 7 is a sequence diagram explaining the flow of a series of reservation scan processes in the first embodiment.

FIG. 8 is a diagram showing an example of a reservation scan setting screen in the first embodiment.

FIG. 9 is a diagram showing an example of reservation scan job settings.

DESCRIPTION OF THE EMBODIMENTS

First Embodiment

Figure 1:
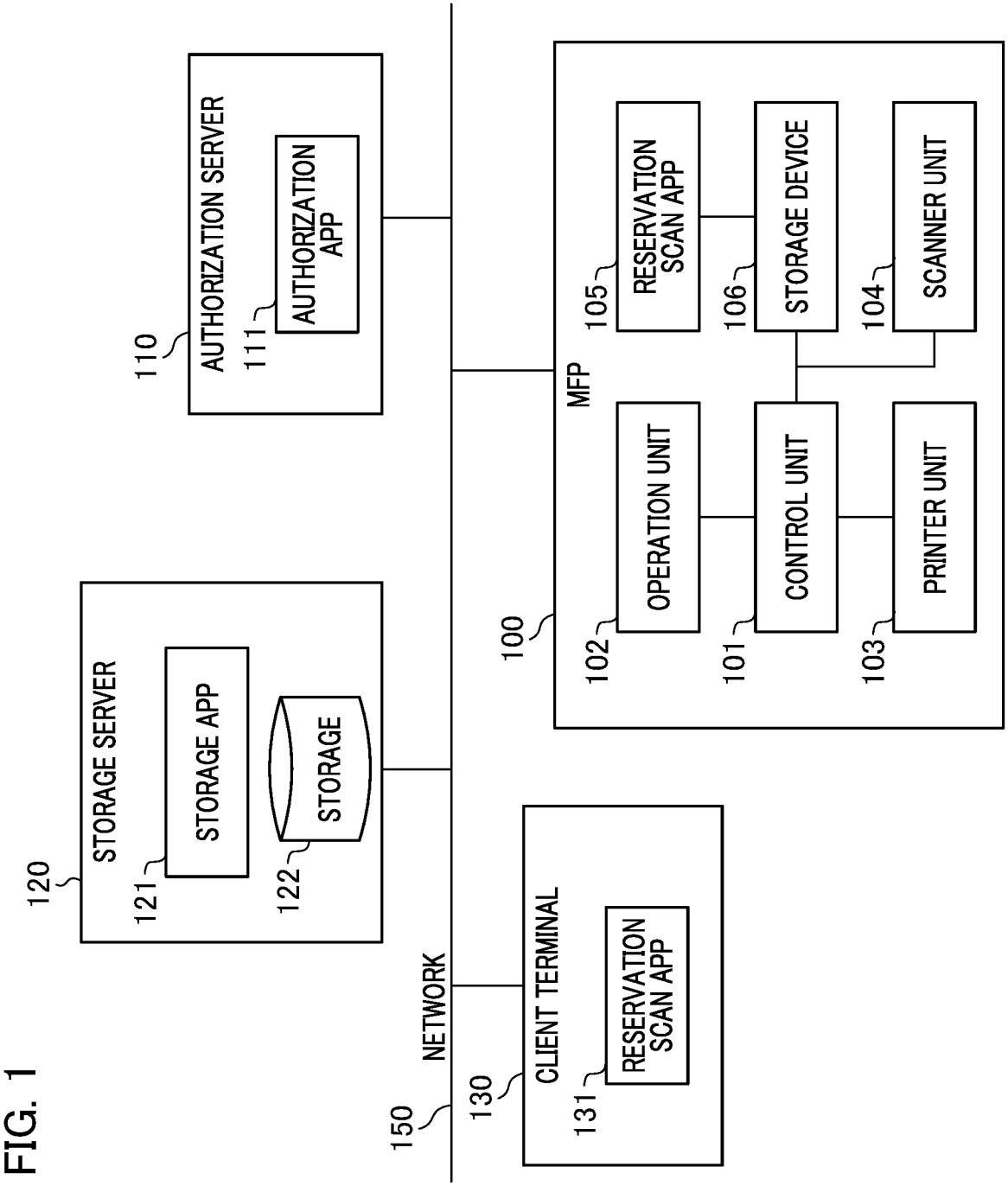
FIG. 1 is a diagram showing an example of a configuration of a system.

FIG. 1 is a drawing showing a configuration example of a system in the present embodiment. The system provides a scan service in which an image processing apparatus that is provided with a storage device and a scanner, client terminals such as a PC and a smartphone, an authorization server, and a storage server cooperate with each other. The system in the present embodiment has a multifunction peripheral (MFP) 100, an authorization server 110, a storage server 120, and a client terminal 130. The MFP 100, the authorization server 110, the storage server 120, and the client terminal 130 are connected to each other via a network 150.

The MFP 100 is an image processing apparatus that is provided with a storage device and a scanner. The MFP 100 has, for example, a function of reading an image by the scanner and printing the image by the printer, and in the present embodiment, the MFP 100 can execute reservation scanning and store a scanned image in a specified external storage. The MFP 100 has an operation unit 102, a control unit 101, a printer unit 103, a scanner unit 104, a reservation scan application 105, and a storage device 106. Note that the MFP 100 may have other functions such as a fax function, a box function, and other functions, and may not necessarily have a printer function.

The scanner unit 104 optically reads a document that has been set on a document table or an auto document feeder (ADF) (not illustrated), and generates image data (image file) that is electronic image file. Additionally, the MFP 100 according to the present embodiment can execute reservation scanning processing. The reservation scanning processing is the processing including scanning and transmission that is executed when a job of reservation scanning is stored (reserved) in a non-volatile region of the MFP 100 and the job is specified and instructed to be executed by an operation of a logged-in user. The reservation scanning job is transmitted from the client terminal 130 to the MFP 100 as a scan ticket including scan settings, a transmission destination (storage destination), and a token. The reservation scan application 105 executes processing related to the reservation scan application. For example, the reservation scan application 105 stores a reservation scan job that has been received from the client terminal 130 in the storage device 106. Additionally, the reservation scan application 105 executes the reservation scan based on the reservation scan job stored in the MFP 100. Furthermore, the reservation scan application 105 in the present embodiment also executes processing of confirming (verifying) whether or the image generated by the reservation scan can be transmitted to the storage 122 that stores the image. The storage device 106 can store a reservation scan job that has been received from the client terminal 130. Additionally, in the storage device 106, a database in which information on a user of the image processing apparatus has been loaded is stored. The information on a user of the image processing apparatus is used for user authentication performed when the user uses the MFP 100.

The printer unit 103 forms an image corresponding to a received print job and outputs the image onto a sheet, or optically reads an original image set on the scanner unit 104 and outputs the image onto a sheet. The operation unit 102 receives an operation from a user, and displays information to the user. The operation unit 102 is, for example, a touch panel, and a user issues instructions such as a job execution instruction to the MFP 100 on a user interface screen that is displayed on the touch panel. The control unit 101 controls the entire MFP 100. The operation unit 102, the printer unit 103, the scanner unit 104, and the storage device 106 are connected to the control unit 101, and realize each function in a multi-function peripheral according to the control of the control unit 101.

The storage server 120 provides a cloud storage service for storing various types of data. In the present embodiment, the storage server 120 stores image data that have been generated by scanning in the MFP 100. The storage server 120 has a storage application 121 and a storage 122. The storage application 121 receives an instruction from the client terminal 130, and performs various types of processing such as storing a file in the storage 122 and returning a list of files and directories stored in the storage 122. The storage 122 stores files such as an image data. Note that the services and functions that the storage server 120 provides may be realized by, in addition to one or a plurality of information processing apparatuses, a virtual machine (cloud service) using resources provided by a data center including the information processing apparatus, or a combination thereof.

The authorization server 110 manages the authority of the client to access the storage server 120. The authorization server 110 has an authorization application 111. Although, in the present embodiment, an example is explained in which the authorization application 111 sends and receives authorization information according to the OAuth mechanism defined in RFC6479, the present invention is not limited thereto. The authorization application 111 issues an access token including the authorization information, and the client terminal 130 receives a service from the storage server 120, which is a resource server by using the access token.

When the client terminal 130 requests access to the storage server 120 together with appropriate authentication information, the authorization application 111 issues an access token for providing access authority to the storage server 120 to the client terminal 130. The client terminal 130 performs an access request to the storage server 120 by using the issued access token. The storage server 120 confirms the validity of the access token that has been passed from the client terminal 130 to the authorization server 110. The authorization server 110 determines the validity of the access token and returns the determination result to the storage server 120. When the access token is valid, the storage server 120 receives access of the client terminal 130. In contrast, when the access token is not valid, the storage server 120 rejects the access of the client terminal 130. Note that the services and functions that the authorization server 110 provides may be realized by, in addition to one or a plurality of information processing apparatuses, a virtual machine (cloud service) using resources provided by a data center including the information processing apparatus, or a combination thereof.

The client terminal 130 is an information processing apparatus, for example, a smartphone and a PC. The client terminal 130 has a reservation scan application 131. The reservation scan application 131 generates a job of reservation scan for performing reservation scan in the MFP 100. In the scan job, one or more settings necessary for scan processing executed by the scanner and transmission processing of a file including an image generated in the scan processing are included. Specifically, in the scan ticket in the present embodiment, information on scan settings and settings of a storage destination of a scanned image file is included. The reservation scan application 131 transmits the set scan job to the MFP 100.

The network 140 may be configured by any one of communication networks such as LAN and WAN, a cellular network (for example, LTE and 5G), a wireless network, Wi-Fi, a phone line, and a dedicated digital line, or a combination thereof. The networks to which the MFP 100, the authorization server 110, the storage server 120, and the client terminals 130 are connected need not all be the same type of network. For example, there may be a configuration in which the MFP 100, the authorization server 110, the storage server 120 are connected via the Internet in a wired manner, and the client terminals 130 is connected via a data communication line. That is, it suffices if the network 140 is configured to be capable of data transmission and reception, and any type of communication methods may be adopted.

Figure 2:
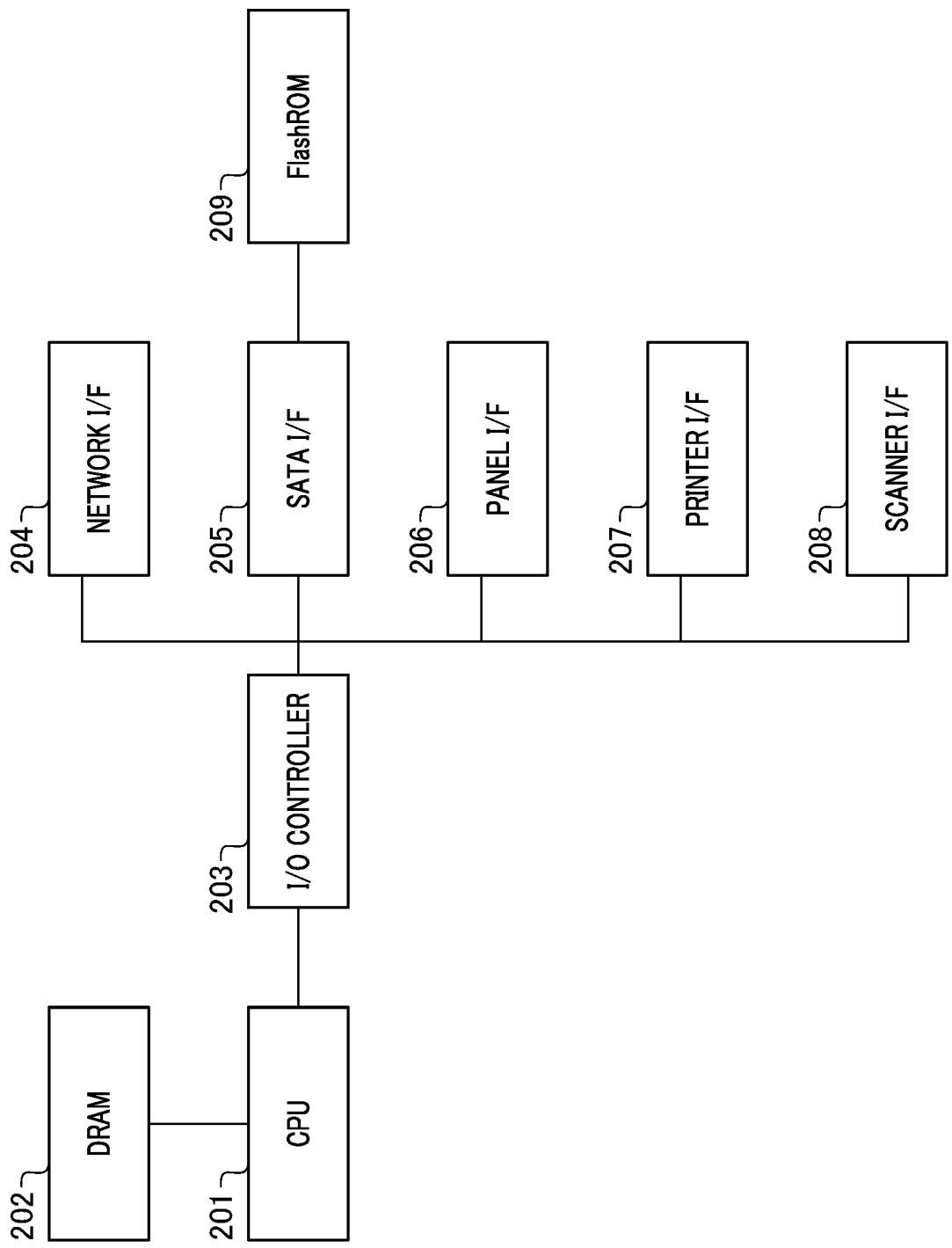
FIG. 2 is a diagram showing a hardware configuration of a control unit of an image processing apparatus.

FIG. 2 is a diagram showing a hardware configuration of the control unit 101 of the MFP 100. The control unit 101 has a CPU 201, a DRAM 202, an I/O controller 203, a network I/F 204, a SATA I/F 205, a panel I/F 206, a printer I/F 207, a scanner I/F 208, and a FlashROM 209. The CPU 201 controls the entire MFP 100 by performing calculation processing. The CPU 201 is connected to the DRAM 202 via a bus. The DRAM 202 is used by the CPU 201 to serve as a working memory for temporarily storing program data that indicates calculation instructions in the process of calculation performed by the CPU 201, and data to be processed. Additionally, the CPU 201 is connected to the I/O controller 203 via a bus. The I/O controller 203 controls input/output to various devices such as the operation unit 102, the printer unit 103, the scanner unit 104, and external devices according to instructions from the CPU 201.

The I/O controller 203 is connected to the FlashROM 209 that is the storage device 106 via a serial advanced technology attachment (SATA) I/F 205. The CPU 201 uses the FlashROM 209 to store programs for realizing the functions of the MFP 100, document files, reservation scan jobs, scan images, and the like. Note that a large capacity storage device including an HDD may be connected to the SATA I/F 205 instead of the FlashROM 209.

Additionally, the I/O controller 203 is connected to the network I/F 204, the panel I/F 206, the printer I/F 207, and the scanner I/F 208. A network 140 is connected to the network I/F 204. The CPU 201 realizes a communication with external devices such as the client terminal 130, the storage server 120, and the like that are connected to the network 140 via the network I/F 204 and the network 140. The CPU 201 realizes input/output for users to the operation unit 102 via the panel I/F 206. The CPU 201 realizes the print processing by using the printer unit 103 via the printer I/F 207. The CPU 201 realizes the scan processing using the scanner unit 104 via the scanner I/F 208.

Here, an example in which the MFP 100 performs a copy function will be explained. The CPU 201 reads program data from the FlashROM 209 to the DRAM 202 via the SATA OF 205. The CPU 201 detects a copy instruction from a user to the operation unit 102 via the panel OF 206 according to a program that has been read into the DRAM 202. When the CPU 201 detects a copy instruction, it receives a document as electronic data from the scanner section 104 via the scanner OF 208, and stores the electronic data in the DRAM 202. The CPU 201 performs image processing, for example, color conversion processing that is suitable for output on image data that has been stored in the DRAM 202. In addition, the CPU 201 sends the image data on which image processing has been performed that has been stored in the DRAM 202 to the printer unit 103 via the printer I/F 207, and performs output processing on a paper medium.

Additionally, an example in which the MFP 100 performs a transmission function will be explained. The processing in which the CPU 201 detects a transmission instruction from a user is the same as the processing of detecting the copy instruction. The transmission instruction includes a transmission protocol, destination specification, image format, and the like from a user. The transmission protocol is, for example, SMB and FTP, and transmission destination specification is specified by, for example, Universal Naming Convention (UNC). The image format is JPEG, PDF, and the like. When the CPU 201 detects a transmission instruction, it receives the document as electronic data from the scanner unit 104 via the scanner OF 208, and stores the electronic data in the DRAM 202. The CPU 201 performs image format conversion and the like on the image that has been stored in the DRAM 202 according to the specification by a user. The CPU 201 transfers and stores the image data that has been stored in the DRAM 202 to a transmission destination by using a protocol specified by a user via the network OF 204. The CPU 201 may specify the storage server 120 as a transmission destination and perform transmission by using an authorization mechanism in which an access token is used.

Figure 3:
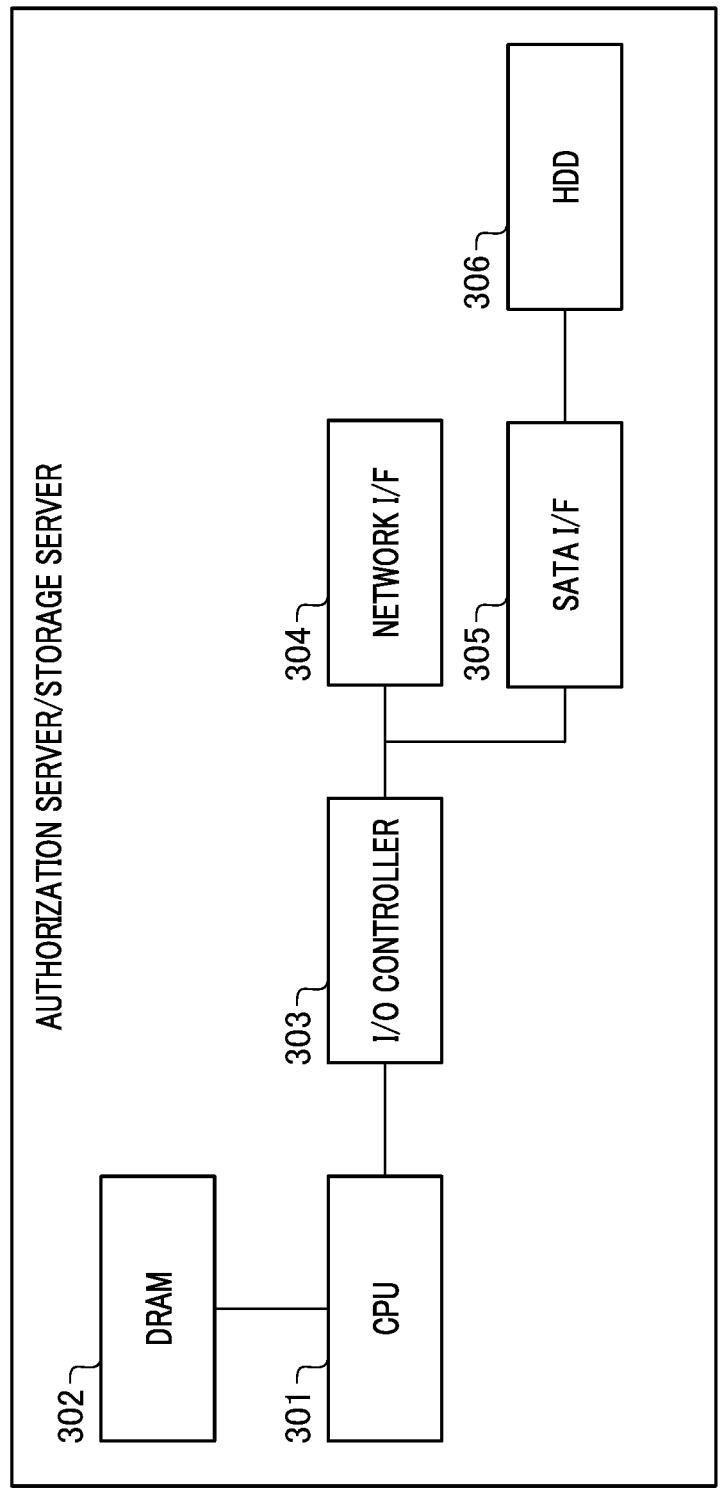
FIG. 3 is a diagram showing a hardware configuration of control units of an authorization server and a storage server.

FIG. 3 is a diagram showing a hardware configuration of the authorization server 110 and the storage server 120. In the following, an example of the configuration of the authorization server 110 will be explained. Note that the storage server 120 also has a configuration of a computer having a processor (CPU) and memory similar to the authorization server 110. The authorization server 110 has a CPU 301, a DRAM 302, an I/O controller 303, a network I/F 304, a SATA I/F 305, and an HDD 306.s The CPU 301 controls the entire authorization server 110. The CPU 301 is connected to the DRAM 302 via a bus. The DRAM 302 is used by the CPU 301 to serve as a working memory for temporarily storing program data that indicate calculation instructions in the process of calculation performed by the CPU 301 and data to be processed. Additionally, the CPU 301 is connected to the I/O controller 303 via a bus.

The I/O controller 303 controls input/output to the network I/F 304 and the SATA I/F 305 according to instructions from the CPU 301. The I/O controller 303 is connected to the network I/F 304. The network I/F 304 is connected to the network 140. The CPU 301 realizes a communication with an external device on the network 140 via the network I/F 304 and the network 140. The I/O controller 303 is connected to the HDD 306 via the Serial Advanced Technology Attachment (SATA) I/F 305. The HDD 306 is an example of storage. The HDD 306 in the authorization server 110 stores, for example, programs, setting values of the authorization application 111 and the like. The HDD 306 in the storage server 120 stores, for example, programs and setting values of the storage application 121 and the like, and image data received from the MFP 100.

Although, in the present embodiment, in an order for explanation, a case in which one CPU 301 uses one memory (DRAM 302) and executes each of the processes as shown in the flowchart to be described below will be exemplified, other modes may be adopted. For example, a plurality of processors, RAMs, ROMs, and storages may cooperate with each other to execute each of the processes as shown in a flowchart to be described below. Additionally, each of the processes can be executed by using a plurality of server computers.

Figure 4:
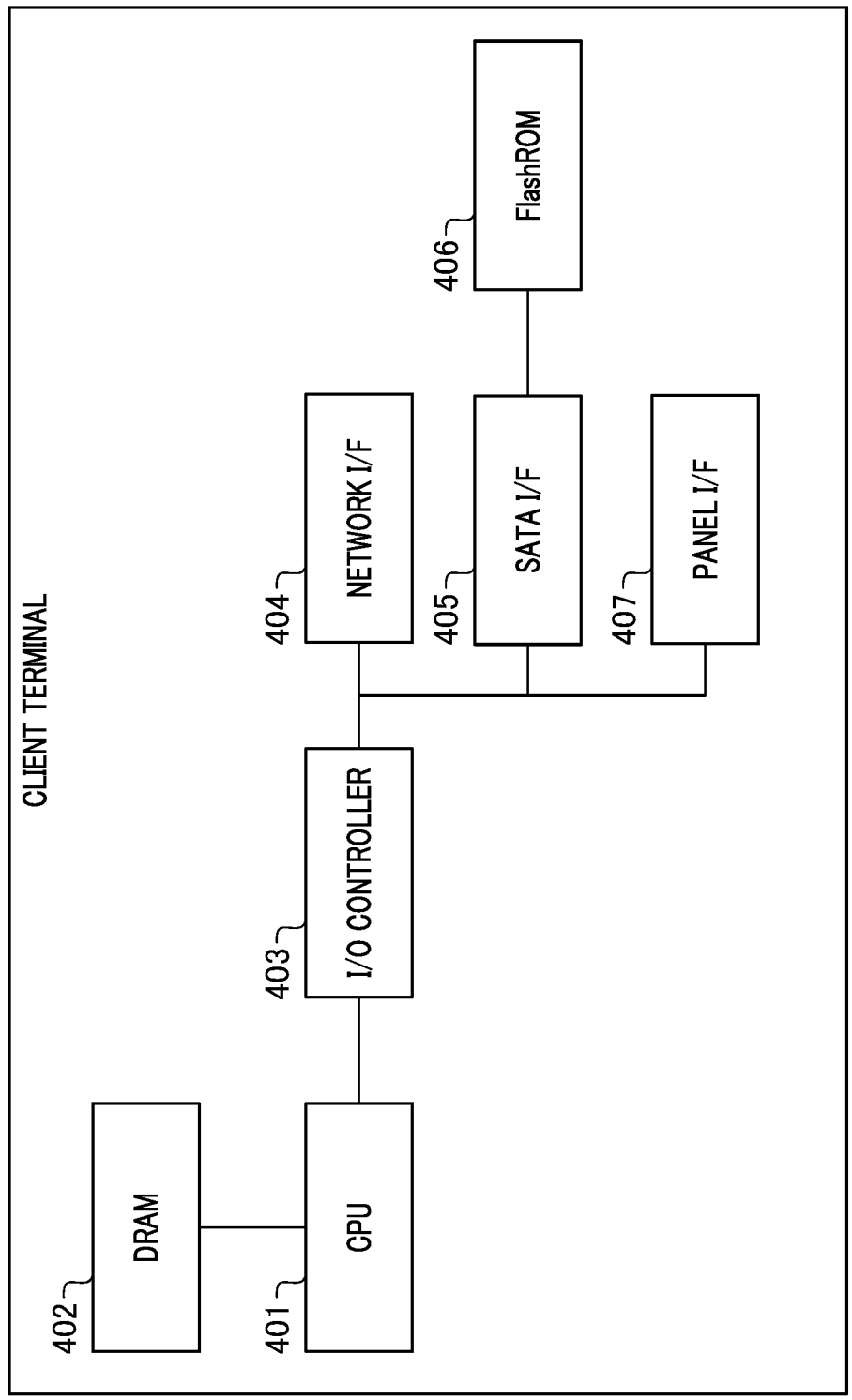
FIG. 4 is a diagram showing a hardware configuration of a control unit of a client terminal.

FIG. 4 is a block diagram showing the hardware configuration of the client terminal 130. The client terminal 130 has the CPU 401, a DRAM 402, the I/O controller 403, a network I/F 404, a Serial Advanced Technology Attachment (SATA) I/F 405, a FlashROM 406, and a panel I/F 407. The CPU 401 controls the entire client terminal 130. The CPU 401 is connected to the DRAM 402 via a bus. The DRAM 402 is used by the CPU 401 to serve as a working memory for temporarily storing program data that indicates calculation instructions in the process of calculation performed by the CPU 401, and data to be processed.

In addition, the CPU 401 is connected to the I/O controller 403 via a bus. The I/O controller 403 controls input/output to the network I/F 404, the SATA I/F 405, and the panel I/F 407 according to instructions from the CPU 401. The I/O controller 403 is connected to the network I/F 404. The network I/F 404 is connected to the network 140. The CPU 401 realizes a communication with an external device on the network 140 via the network I/F 404 and the network 140.

The I/O controller 403 is connected to a FlashROM 410, which is a storage device, via a serial advanced technology attachment (SATA) I/F 405. Note that the storage device is not limited to the FlashROM, and may be a mass storage device including an HDD and the like. The FlashROM 410 is used to store programs such as the reservation scan application 131, and various setting values. Additionally, the I/O controller 403 is connected to a panel I/F 407. The CPU 401 realizes input/output for users to the operation unit of the client terminal 130 that is connected via the panel I/F 407. The operation unit is, for example, a touch panel or a camera that is an image reading device.

Figure 5:
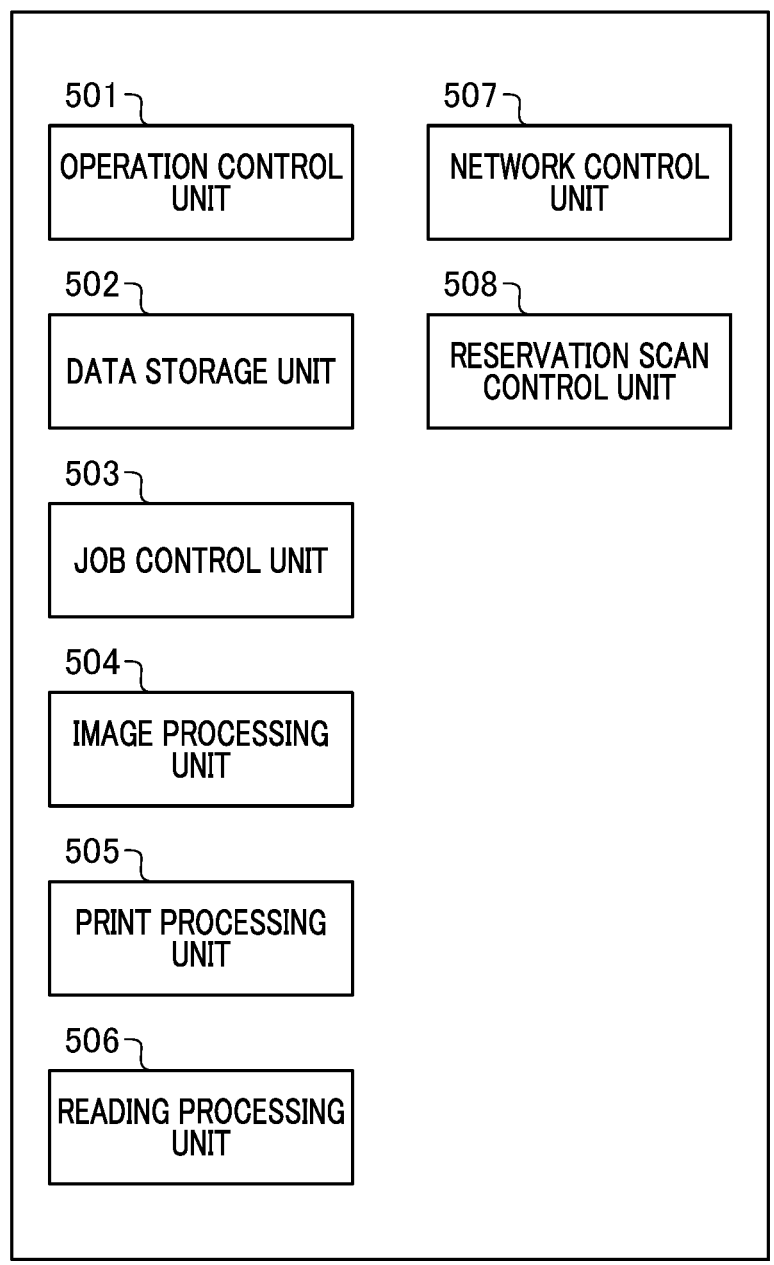
FIG. 5 is a diagram showing a software configuration of an image processing apparatus.

FIG. 5 is a diagram showing a software configuration of the MFP 100. The software configuration of the MFP 100 is realized by the CPU 201 of the control unit 101 reading a program stored in the FlashROM 211 into the DRAM 202 and then executing the program. The MFP 100 has an operation control unit 501, a data storage unit 502, a job control unit 503, an image processing unit 504, a print processing unit 505, a reading processing unit 506, a network control unit 507, and a reservation scan control unit 508.

The operation control unit 501 controls the display and reception of an operation in the operation unit 102. Specifically, the operation control unit 501 displays a screen image for the user on the operation unit 102. Additionally, the operation control unit 501 detects a user operation and performs processing in association with screen components such as a button that is displayed on the screen. The data storage unit 502 controls recording in and reading from the FlashROM 211, which is the storage device 106. For example, the data storage unit 502 stores a request from another unit or a scanned image that has been generated by scan processing in the FlashROM 211.

The job control unit 503 controls the execution of the job. The image processing unit 504 processes image data into a format that is suitable for the intended use according to an instruction from the job control unit 503. The print processing unit 505 controls printing processing that is performed by the printer unit 103. Specifically, the print processing unit 505 prints and outputs an image on a paper medium via the printer I/F 207 according to an instruction from the job control unit 503.

The reading processing unit 506 controls scan processing that is performed by the scanner unit 104. Specifically, the reading processing unit 506 reads a set document via the scanner OF 208 according to an instruction from the job control unit 503. The network control unit 507 controls input/output of data to and from external devices via the network OF 204 and the network 140. Additionally, the data storage unit 502 can access the data that are stored in the FlashROM 209 from an external device via the network control unit 507. Examples of data stored in the FlashROM 209 include image data such as PDF and JPEG.

The reservation scan control unit 508 controls the processing related to reservation scan. For example, the reservation scan control unit 508 receives a reservation scan job from external devices such as the client terminal 130 via the network control unit 507. Additionally, the reservation scan control unit 508 acquires an access token that is necessary for transmission processing using a scan job from the client terminal 130. Additionally, the reservation scan control unit 508 controls the processing of issuing a scan ID corresponding to the reservation scan job that has been acquired from the client terminal 130, and storing the received reservation scan job and the scan ID in the storage device 106 in association with each other. The scan ID is identification information for uniquely identifying the reservation scan jobs. Additionally, the reservation scan control unit 508 controls the processing of instructing the operation control unit 501 to display the reservation scan job on the operation unit 102. Additionally, the reservation scan control unit 508 controls the processing of confirming whether or not a scan image can be transmitted to a specified transmission destination (pre-transmission confirmation). In the pre-transmission confirmation, the reservation scan control unit 508 confirms whether or not transmission is possible based on at least one of the network settings that is applied to the MFP 100, the policy setting of the network that is applied to the MFP 100, and the connection to the transmission destination. Furthermore, the reservation scan control unit 508 reports the confirmation result of the pre-transmission confirmation to the client terminal 130. Additionally, the reservation scan control unit 508 receives the selection of scan jobs that has been performed by a user who operates the MFP 100, and executes the scan processing based on the reservation scan job. Then, the reservation scan control unit 508 controls the processing of transmitting a file including an image that has been generated by the scan processing to the storage server 120 that is a specified transmission destination.

An overview of the reservation scan operation in the first embodiment will be explained using FIG. 6 to FIG. 18. In the first embodiment, when the MFP 100 receives a reservation scan job from the client terminal 130, processing of confirming whether or not the transmission of a scan image to a specified transmission destination is possible is performed. It becomes possible to provide, to a user, a notification about whether or not transmission to the transmission destination that is currently set is possible before the reservation scan based on the reservation scan job is executed in the MFP 100, by confirming whether or not transmission is possible when the reservation scan job is received in the MFP 100.

FIG. 6 and FIG. 7 are sequence diagrams that explain the flow of a series of reservation scan processes in the first embodiment. Note that FIG. 6 and FIG. 7 illustrate a case in which it is determined that the scanned image can be transmitted, in the confirmation of whether or not the scanned image can be transmitted. In the present embodiment, each process executed in the MFP 100 as shown in FIG. 6 and FIG. 7 is realized by the CPU 201 reading a program stored in the FlashROM 210 into the DRAM 202, and executing the program. Each process executed on the authorization server 110 and storage server 120 as shown in FIG. 6 and FIG. 7 is realized by the CPU 301 reading a program stored in the HDD 306 into the DRAM 302, and executing the program. Each process executed by the client terminal 130 as shown in FIG. 6 and FIG. 7 is realized by the CPU 401 reading a program stored in FlashROM 406 into the DRAM 402, and executing the program.

This processing is started when the user selects the reservation scan application 131 on the client terminal 130 to start the setting of the reservation scan. In S601, the CPU 401 of the client terminal 130 activates the reservation scan application 131 in response to a user operation. In S602, the reservation scan application 131 of the client terminal 130 displays a reservation scan setting screen, and receives a reservation scan setting requested to the MFP 100 by the user.

FIG. 8 is a diagram showing an example of a reservation scan setting screen in the first embodiment. A reservation scan setting screen 800 is displayed on the screen of the client terminal 130 by the reservation scan application 131. For example, scan settings 801, a transmission destination 802, a name 803, a path selection button 804, an OK button 805, and the like are displayed on the reservation scan setting screen 800. The scan settings 801 are items for performing scan settings. In the scan settings 801, for example, settings such as a read document size settings such as A3 or A4, colors settings such as full color and grayscale, and file type settings for an image file to be stored, such as JPEG or PDF. are performed. The transmission destination 802 is an item for specifying a location where image data generated by scanning is stored. In the transmission destination 802, for example, a server, a path, and the like of a storage destination are set.

The name 803 is an item for setting a name of the reservation scan job. The path selection button 804 is a button for selecting a path to the transmission destination (storage destination) of the scanned image. When the path selection button 804 is pressed, the reservation scan application 131 acquires an access token and displays a directory list screen of a server. The user selects the path to the storage destination on the directory list screen, and the reservation scan application 131 receives the selection by users and sets the storage destination. When the storage server 120 is set as the storage destination, the user selects the path to the storage destination from the directory list screen of the storage server 120. Note that, in the present embodiment, it is assumed that the storage server 120 has been specified in advance as the server of the transmission destination 802 and the image processing apparatus 100 has been specified in advance as the transmission destination of the reservation scan job on the client terminal 130. However, the present invention is not limited thereto. The storage server 120 and the MFP 100 may be selected on the reservation scan setting screen 800, without specification in advance on the client terminal 130. The OK button 805 is a button for completing the reservation scan setting and transmitting a reservation scan job based on the settings to the MFP 100. When the OK button 805 is pressed by the user, the reservation scan application 131 generates a reservation scan job with the reservation scan settings at that time and makes a reservation scan request to the MFP 100. Note that the setting in FIG. 8 is one example, and other settings may be used, or some of the settings may be used if the present embodiment can be realized.

The description will return to FIG. 6. In S603, when detecting that the OK button 805 of the reservation scan setting screen 800 is pressed, the reservation scan application 131 of the client terminal 130 makes a request to the MFP 100 for the reservation scan. In the reservation scan request, the client terminal 130 transmits, to the MFP 100, a reservation scan job that has been generated based on the setting in S602 and an access token for using the storage 122 serving as a storage destination with the authority of the user. The access token is a token that has been obtained from an authentication service that is provided by the authorization server 110.

In S604, the reservation scan control unit 508 in the MFP 100 refers to the settings of the reservation scan included in the reservation scan job that has been received from the client terminals 130, and performs confirmation of whether or not the scanned image can be transmitted to the specified transmission destination of the scanned image (pre-transmission confirmation). What is confirmed in the pre-transmission confirmation is, for example, whether or not the MFP 100 can access the storage server 120 at the transmission destination, and whether or not the network policy applied to the MFP 100 permits access to the storage server 120 at the transmission destination. Note that the confirmation content is not limited thereto, and another confirmation method may be used.

In the following steps after S605, a case in which it is determined that the transmission is possible in the pre-transmission confirmation in S604 will be described. A case in which the transmission has failed will be described below with reference to the sequence diagram illustrated in FIG. 13. In S605, the reservation scan control unit 508 in the MFP 100 issues a scan ID corresponding to the reservation scan job that has been acquired from the client terminal 130 in response to the request in S603. In S606, the reservation scan control unit 508 in the MFP 100 stores the reservation scan job setting in response to the request that has been received from the client terminal 130. The reservation scan control unit 508 stores the reservation scan job settings based on a scan ticket and the access token acquired from the client terminal 130 in response to the request in S603, and the scan ID issued in S605.

FIG. 9 is a diagram showing an example of reservation scan job settings. For example, scan settings 901, a transmission destination 902, a name 903, an access token 904, and a scan ID 905 are stored in the reservation scan job settings. The scan settings 901, the transmission destination 902, and the name 903 are the contents set on the reservation scan setting screen 800 in S602. The scan settings 901 corresponds to the scan settings 801. The transmission destination 902 corresponds to the transmission destination 802. The name 903 corresponds to the name 803. The access token 904 is an access token used for storing the scanned image in the transmission destination, and is an access token that has been acquired from the authorization server 110 and transmitted to MFP 100 by the reservation scan application 131 together with the reservation scan job in S603. The scan ID 905 is a scan ID issued in S605.

The description will return to FIG. 6. In S607, the reservation scan control unit 508 in the MFP 100 performs a response to the reservation scan request in S603 to the client terminal 130. In a case in which it is determined that transmission is possible in the pre-transmission confirmation in S604, that is, in a case in which the request for reservation scan is successful, the response in this case includes a scan ID corresponding to the reservation scan request that has been issued in S605. In S608, the reservation scan application 131 of the client terminal 130 displays the result of the reservation scan request that has been requested to the MFP 100 in S603 on the display of the client terminal 130, based on the response acquired from the MFP 100 in S607.

Figure 10:
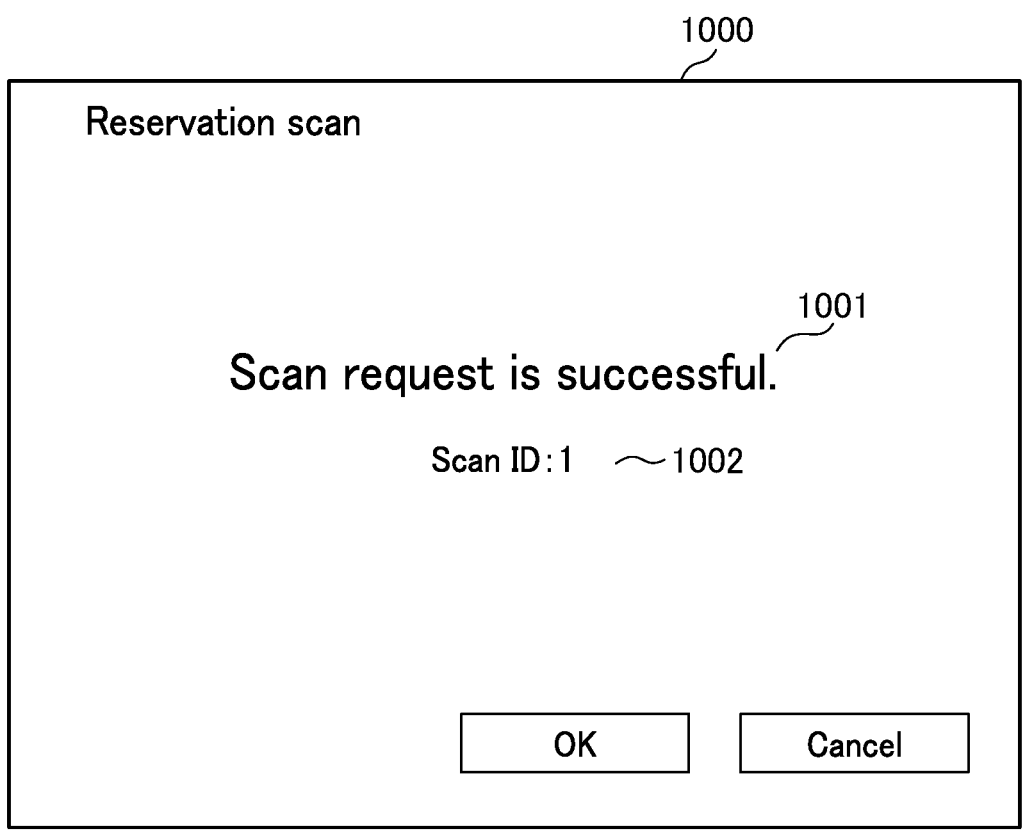
FIG. 10 is a diagram showing an example of a result screen when a request for a reservation scan is successful.

FIG. 10 is a diagram showing an example of a result screen when a request for a reservation scan is successful. A scan ID 1002 that has been issued in the MFP 100 is displayed on a result screen 1000 in a case in which the request for reservation scan is successful, together with a message 1001 indicating that the request for reservation scan is successful. Note that, on the result screen 1000 in a case in which the request for the reservation scan is successful, a button for canceling the requested reservation scan job may be displayed, or a button for changing the setting of the reservation scan job again may be displayed.

Figure 11:
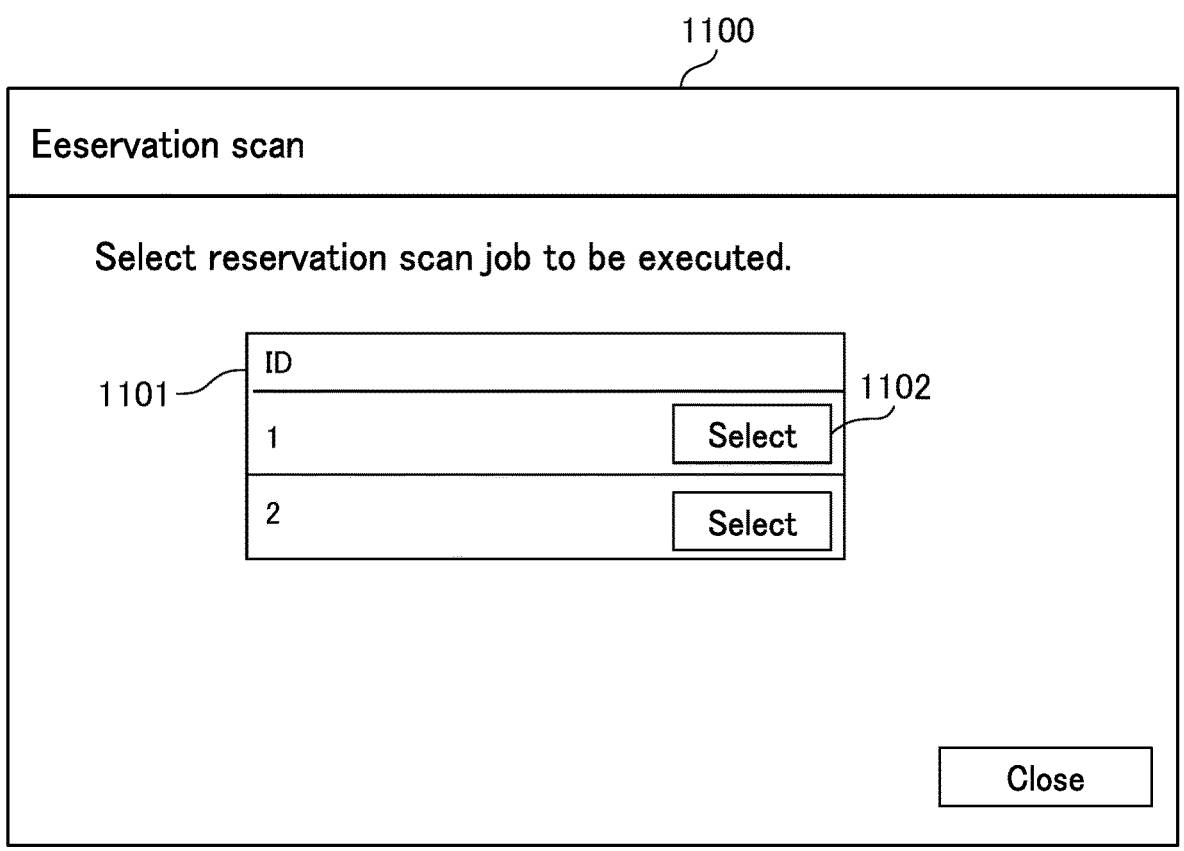
FIG. 11 is a diagram showing an example of a reservation scan selection screen.

The description will return to FIG. 6. In S609, the reservation scan control unit 508 in the MFP 100 activates the reservation scan application in response to an instruction from the user who operates the MFP 100. In S610, the reservation scan control unit 508 in the MFP 100 displays a reservation scan job selection screen on the operation unit 102, and receives the selection of reservation scan jobs that has been performed by the user. FIG. 11 is a diagram showing an example of a reservation scan selection screen. On a reservation scan selection screen 1100, a reservation scan job list 1101 that is stored in the MFP 100 is displayed. For example, the scan ID of the reservation scan job and a selection button 1102 are displayed in the reservation scan job list 1101. The user selects the selection button 1102 corresponding to the reservation scan job to be executed, thereby instructing a reservation scan job to be executed in the MFP 100. Note that although an example in which the scan ID is displayed in the reservation scan job list 1101 has been explained, the present invention is not limited thereto. For example, the name of the reservation scan job may be displayed. Additionally, other information such as scan settings and the date and time at which the reservation scan job was specified may be displayed in the reservation scan job list 1101. Additionally, in the present embodiment, an example has been explained in which the user authentication is not performed in the MFP 100, and all the reservation scan jobs that are stored in the MFP 100 are displayed in the list 1101 of reservation scan jobs. However, the present invention is not limited thereto. For example, user authentication may be performed at the time of login to the MFP 100, and only reservation scan jobs corresponding to the authenticated user may be displayed in the reservation scan job list 1101.

Figure 12:
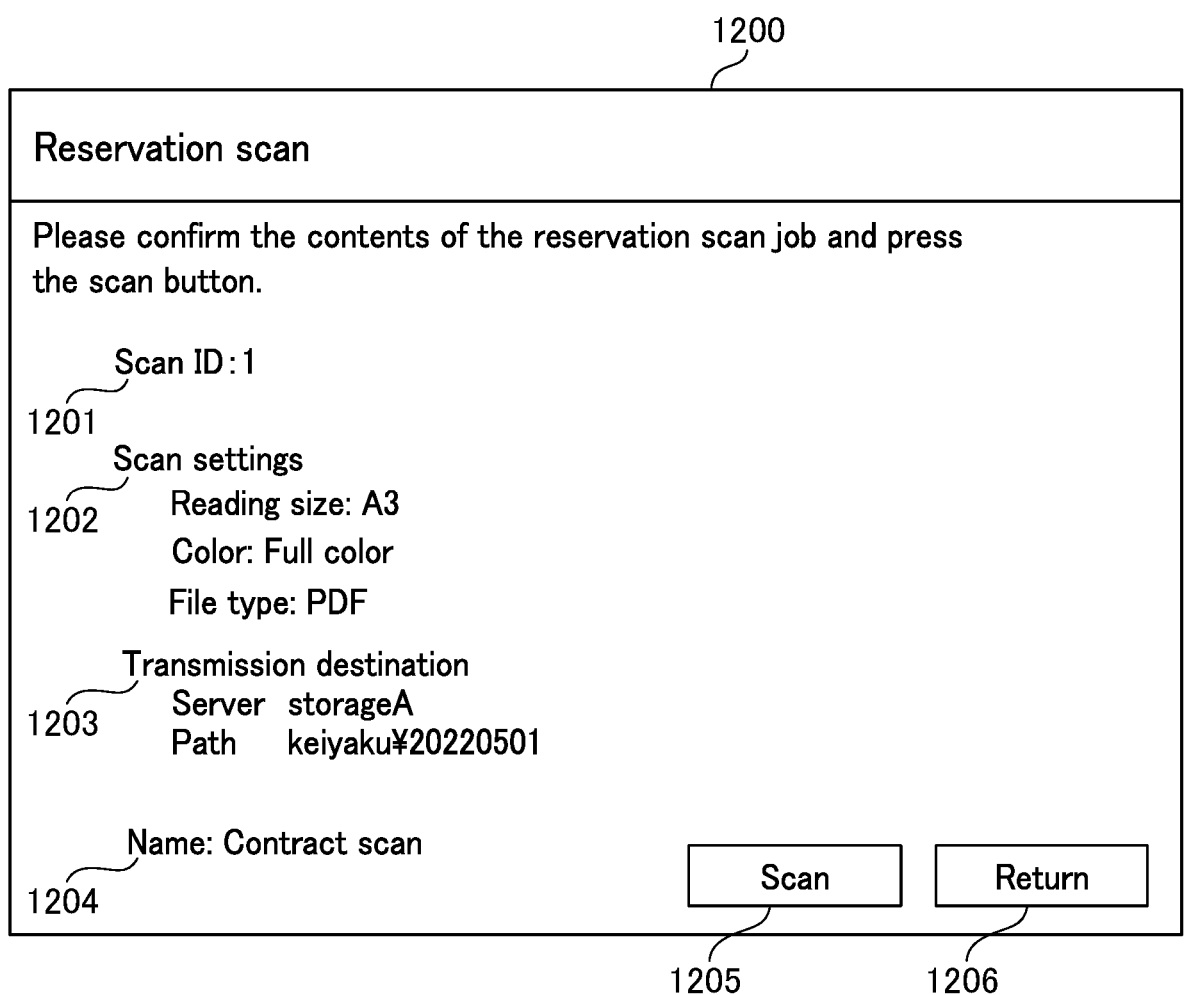
FIG. 12 is a diagram showing an example of a reservation scan execution screen.

In S611, the reservation scan control unit 508 in the MFP 100 displays a reservation scan execution screen corresponding to the reservation scan job that has been selected in S610 on the operation unit 102. FIG. 12 is a diagram showing an example of a reservation scan execution screen. On a reservation scan execution screen 1200, for example, a scan ID 1201, scan settings 1202, a transmission destination 1203, a name 1204, a scan execution button 1205, and a return button 1206 are displayed. The scan ID 1201, the scan settings 1202, the transmission destination 1203, and the name 1204 are displayed based on the reservation scan job settings that have been stored in the MFP 100 in S606. The scan ID 1201 is the scan ID of the reservation scan job that has been selected in S610. The scan settings 1202 are scan settings set for the reservation scan job selected in S610. Note that a setting change button for changing the scan setting may be displayed on the reservation scan execution screen 1200. When the user selects the setting change button, the reservation scan control unit 508 displays a scan setting change screen (not illustrated) on the operation unit 102. The user can change the scan setting to a setting that is different from the scan setting for the reservation scan job set by the client terminal 130, on the scan setting change screen. When the scan settings are changed on the scan setting change screen, the reservation scan control unit 508 displays the scan settings that have been changed on the scan setting 1202. The transmission destination 1203 is a storage destination of the scanned image data that has been set in the reservation scan job selected in S610. In the present embodiment, the storage destination of the storage server 120 is displayed in the transmission destination 1203. A name 1204 is the name of the reservation scan job that has been selected in S610. When the scan execution button 1205 is selected, the reservation scan control unit 508 performs the processing of S612. When the return button 1206 is selected, the reservation scan control unit 508 returns the screen that is displayed on the operation unit 102 to the reservation scan selection screen 1100. Note that, on the reservation scan execution screen 1200, a button for canceling the reservation scan job that is being displayed may be displayed.

When the scan execution button 1205 is selected, the MFP 100 executes the scan processing based on the scan settings 1202 in S612 and S613, and the MFP 100 performs storage processing for storing image data that has been generated by scanning in a specified storage destination. First, in S612, the reservation scan control unit 508 in the MFP 100 executes the scan processing with the specified scan settings to generate an image file (image data). Then, in S613, the reservation scan control unit 508 in the MFP 100 transmits a file including an image that has been generated by the scan processing to the storage server 120. The file to be transmitted to the storage server 120 includes, for example, an image file that has been generated by scanning, an access token corresponding to the reservation scan job, and a transmission destination and a name of the storage server 120 that have been selected in S610.

In S614, the storage application 121 of the storage server 120 confirms with the authorization server 110 whether or not the access token that has been received from the MFP 100 is valid. The storage application 121 transmits the access token that has been acquired from the MFP 110 to the authorization server 110, and confirms the validity of the access token. In S615, the authorization application 111 of the authorization server 110 confirms whether or not the access token that has been transmitted from the storage server 120 is valid. In the present embodiment, a case in which the access token is valid will be described. In S616, the authorization application 111 of the authorization server 110 provides a notification to the storage server 120 about a confirmation result of the access token. In the present embodiment, the authorization application 111 of the authorization server 110 provides a notification to the storage server 120 about the result indicating that the access token is valid. Note that if the access token is not valid, for example, an error is notified from the storage server 120 to the MFP 100, and an error screen is displayed in the MFP 100.

In S617, the storage application 121 of the storage server 120 confirms the confirmation result of the access token that has been received from the authorization server 110. When the access token is valid, the process of S618 is performed. In S618, the storage application 121 of the storage server 120 stores the image file in the storage destination specified from the MFP 100, that is, the transmission destination that has been specified in S613. In S619, the storage application 121 of the storage server 120 provides a notification about the transmission result of the image file to the MFP 100. In the present embodiment, a case in which the transmission of the image file is successful will be described. In S620, the reservation scan control unit 508 in the MFP 100 displays the transmission result returned from the storage server 120 on the operation unit 102. When the image file has been successfully stored in the specified storage destination, a message indicating that the image file has been successfully stored is displayed. In contrast, if the image file has not been successfully stored in the specified storage destination, an error message is displayed, for example, and this sequence ends.

Figure 13:
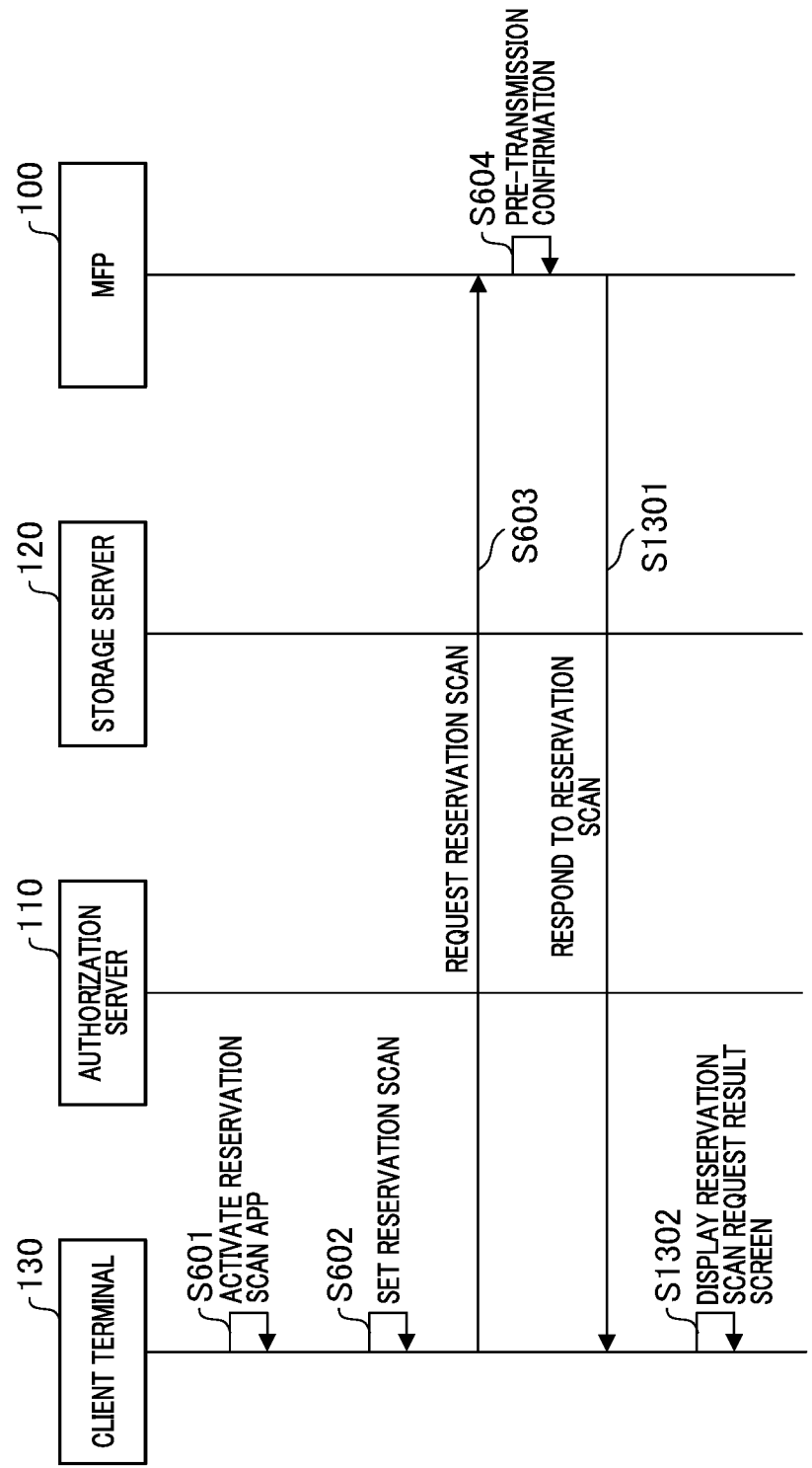
FIG. 13 is a sequence diagram explaining the flow of a series of reservation scan processes in the first embodiment.

In FIG. 6 and FIG. 7, the case in which it is determined that transmission is possible in the confirmation of whether or not the scanned image can be transmitted (pre-transmission confirmation) in S604 has been explained. Here, the case in which it is determined that the transmission is not possible in the pre-transmission confirmation in S604 will be explained. FIG. 13 is a sequence diagram in the case in which it is determined that the transmission is not possible in the pre-transmission confirmation. In the present embodiment, each process executed in the MFP 100 as shown in FIG. 13 is realized by the CPU 201 reading a program stored in the FlashROM 210 into the DRAM 202, and executing the program. Each process executed by the client terminal 130 as shown in FIG. 13 is realized by the CPU 401 reading a program stored in the Flash ROM 406 into the DRAM 402, and executing the program.

In the processes of FIG. 13, the processes similar to those of FIG. 6 are denoted by the same reference numerals, and description thereof will be omitted. In S604, the reservation scan control unit 508 in the MFP 100 refers to the settings of reservation scan included in the reservation scan job that has been received from the client terminals 130 in S603, and performs confirmation of whether or not transmission to the specified transmission destination of the specified scanned image (pre-transmission confirmation) is possible. When it is determined that transmission is possible, the process of S605 as shown in FIG. 6 is performed. In contrast, when it is determined that transmission is not possible, the process of S1301 is performed.

In the following steps after S1301, a case in which it is determined that the transmission is not possible (failed) in the pre-transmission confirmation in S604 is illustrated. In S1301, the reservation scan control unit 508 in the MFP 100 performs a response to the reservation scan request in S603 to the client terminals 130. The response to the failure of the pre-transmission confirmation may include the cause of the failure of the pre-transmission confirmation together with the result of the pre-transmission confirmation.

Figure 14:
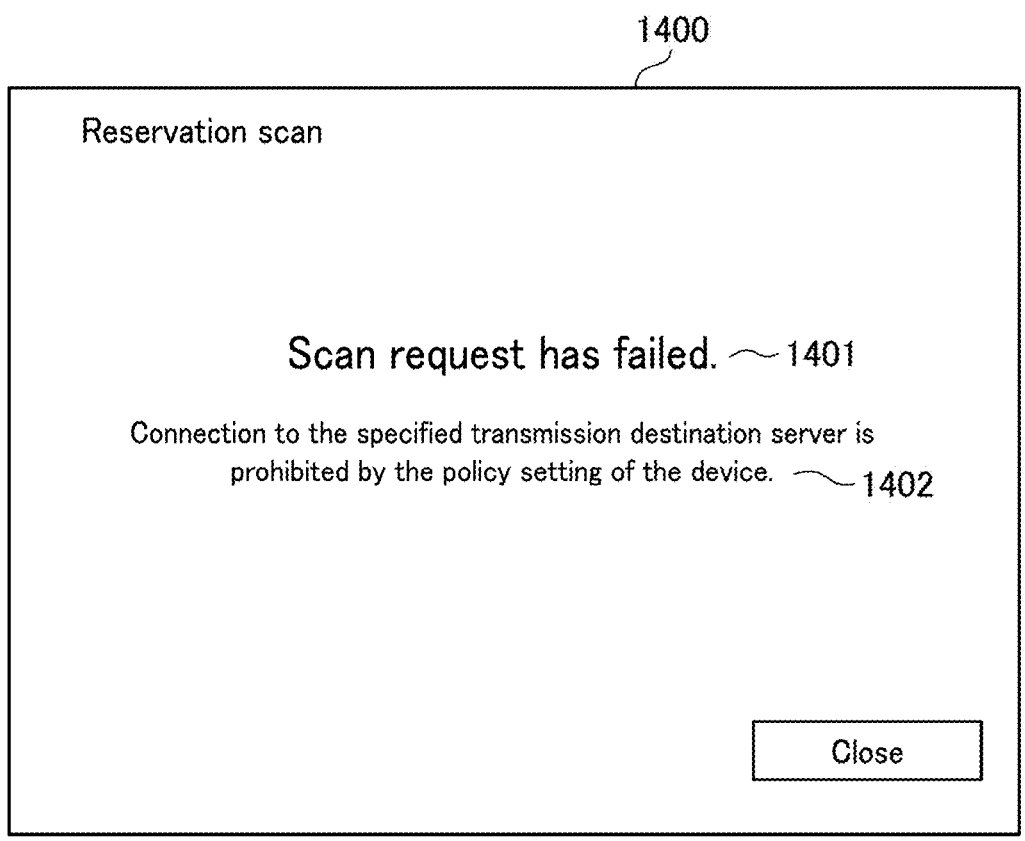
FIG. 14 is a diagram showing an example of a result screen when a request for a reservation scan has failed.

In S1302, the reservation scan application 131 on the client terminal 130 displays, on the display of the client terminal 130, the result of the reservation scan request that has been performed to the MFP 100 in S603, based on the response notified from the MFP 100 in S1301. FIG. 14 is a diagram showing an example of a result screen when a request for a reservation scan has failed. On a result screen 1400 in a case in which the request for the reservation scan has failed, for example, a failure reason 1402 is displayed together with a message 1401 indicating that the request for the reservation scan has failed. Note that, on the result screen 1400 in a case in which the request for the reservation scan has failed, a screen showing how to handle errors or a screen on which transmission destination setting can be changed may be displayed.

An example has been explained with reference to FIG. 6 and FIG. 13 in which, when the transmission is possible in the pre-transmission confirmation, the scan ID is issued in S605 and S606, the reservation scan settings are stored in the MFP 100, and, when the transmission is not possible in the pre-transmission confirmation, the scan ID is not issued. However, the present invention is not limited thereto. As another embodiment, a configuration may be adopted in which even in a case in which it is determined that the transmission is not possible in the pre-transmission confirmation, the scan ID is issued, the reservation scan settings are stored in the MFP 100, and the reservation scan can be executed. By issuing a scan ID and reserving the reservation scan job in the MFP 100 even in a case in which it is determined, in the pre-transmission confirmation, that transmission is not possible, the user can execute the reservation scan job without performing scan settings again after handling the cause of transmission not being possible. Furthermore, when it is determined in the pre-transmission confirmation that transmission is not possible, whether or not to issue a scan ID may be switched depending on the cause of transmission not being possible. That is, when the cause of the transmission not being possible is a specific cause specified in advance, the scan ID is not issued and the job is not stored, and when the cause of the transmission not being possible is not a specific cause specified in advance, the scan ID is issued, and the reservation scan job is stored in the storage device 106. For example, the scan ID is not issued if it is determined that the transmission is not possible due to the network policy, and the scan ID is issued if it is determined that the transmission is not possible due to the storage server at the transmission destination being temporarily down.

Figure 15:
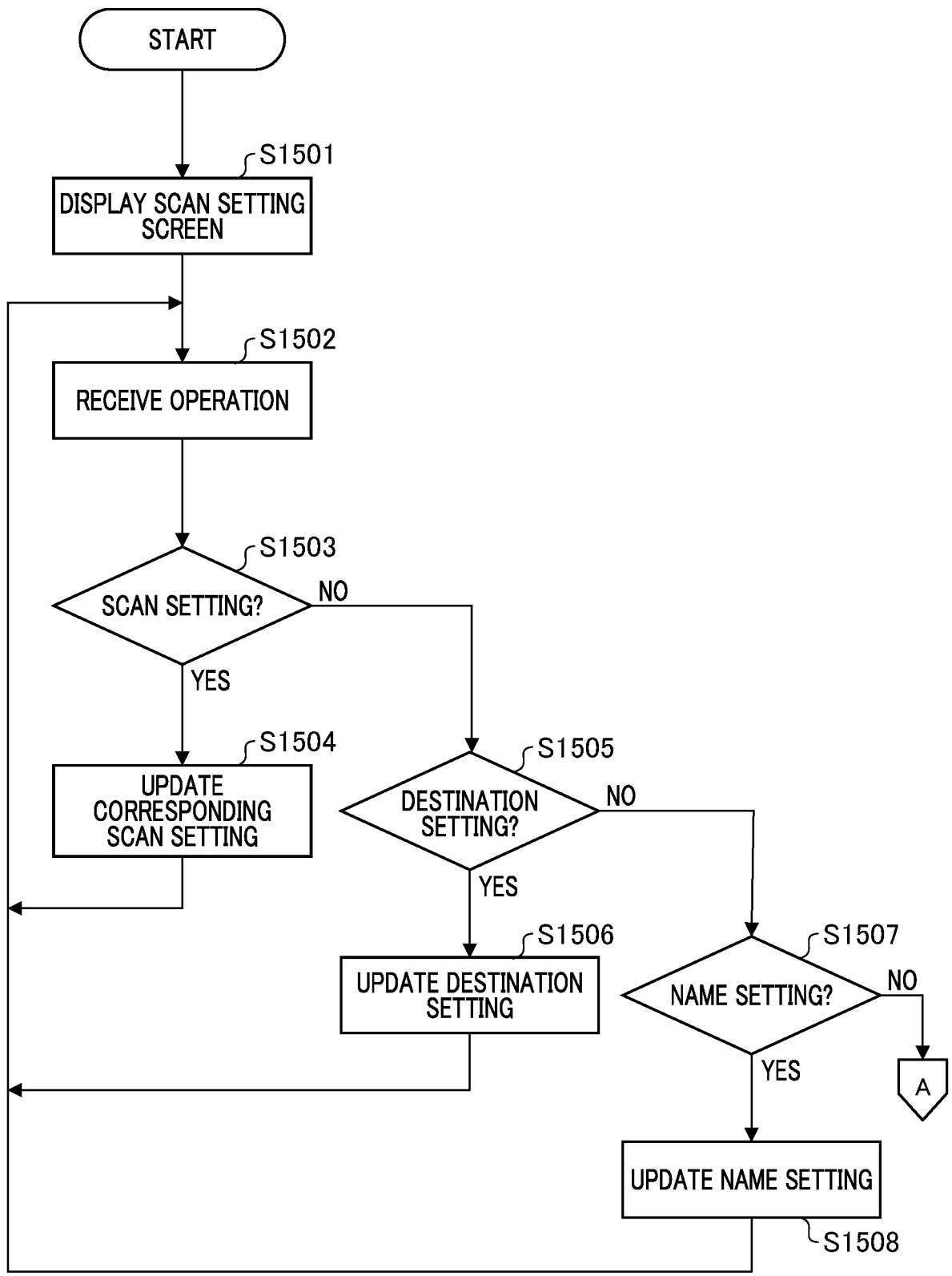
FIG. 15 is a diagram showing a flow chart showing the reservation scan processing in the client terminal according to the first embodiment.
Figure 16:
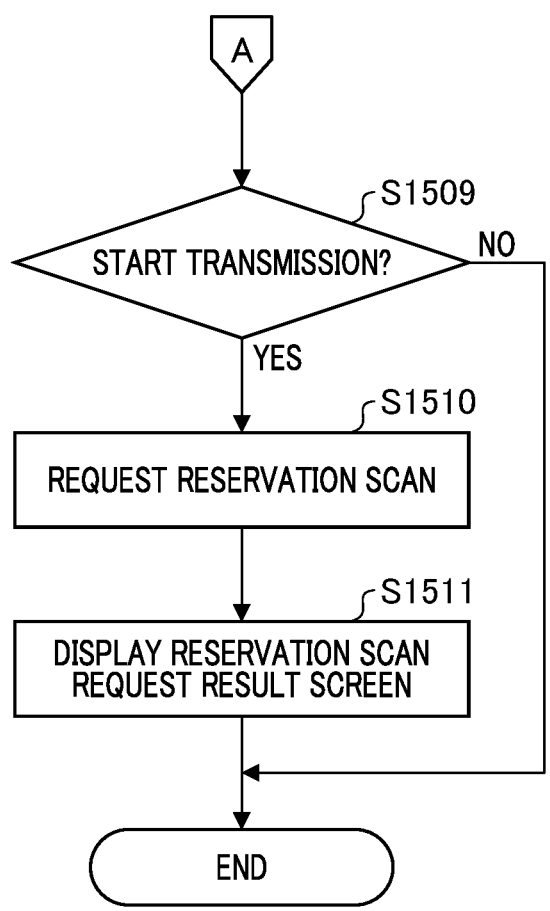
FIG. 16 is a diagram showing a flow chart showing the reservation scan processing in the client terminal according to the first embodiment.

FIG. 15 and FIG. 16 are flowcharts illustrating the reservation scan processing in the client device 130 according to the first embodiment. Each of the processes illustrated in FIG. 15 and FIG. 16 is executed by the reservation scan application 131 of the client device 130. Each of the processes executed by the client terminals 130 as shown in FIG. 15 and FIG. 16 is realized by the CPU 401 reading a program stored in the FlashROM 406 into the DRAM 402, and executing the program.

This processing is started when the user selects the reservation scan application 131 to start the setting of the reservation scan on the client terminal 130, and the reservation scan application 131 is activated. In S1501, the CPU 401 of the client terminal 130 displays the reservation scan setting screen 800 (FIG. 8). The process of S1501 corresponds to the process of S602 in FIG. 6 and FIG. 13. In S1502, the reservation scan application 131 of the client terminal 130 receives (detects) a user operation on the reservation scan setting screen 800. The operations to be received includes an operation of changing the settings of the scan settings 801, the transmission destination 802, and the name 803, and a transmission start operation performed by pressing the OK button 805.

In S1503, the reservation scan application 131 on the client terminal 130 determines whether or not the operation that has been received from the user in S1502 is an operation related to the scan settings 801. When the operation received from the user in S1502 is scan setting, the process of S1504 is performed. In S1504, the reservation scan application 131 on the client terminal 130 updates the scan setting in response to the user operation. Subsequently, the process returns to S1502. In contrast, when the operation is not the scan setting, the process of S1505 is performed.

In S1505, the reservation scan application 131 on the client terminal 130 determines whether or not the operation received from the user in S1502 is an operation related to the setting of the transmission destination 802. When the operation received from the user in S1502 is an operation related to the setting of the transmission destination, the process of S1506 is performed. In S1506, the reservation scan application 131 on the client terminal 130 updates transmission destination settings in response to a user operation. Subsequently, the process returns to S1502. In contrast, if the operation received from the user in S1502 is not an operation related to the setting of the transmission destination, the process of S1507 is performed.

In S1507, the reservation scan application 131 on the client terminal 130 determines whether or not the operation received from the user in S1502 is an operation related to the setting of the name 803. When the operation received from the user in S1502 is an operation related to the name setting, the process of S1508 is performed. In S1508, the reservation scan application 131 on the client terminal 130 updates name setting in response to a user operation. Subsequently, the process returns to S1502. In contrast, if the operation received from the user in S1502 is not an operation related to the name setting, the process of S1509 is performed.

In S1509, the reservation scan application 131 on the client terminal 130 determines whether or not the operation received from the user is the start of transmission. If the operation is the start of transmission, that is, if the OK button 805 of the reservation scan setting screen 800 is pressed, the process of S1510 is performed. If the operation is not the start of transmission, for example, when a cancel button of the reservation scan setting screen 800 is pressed, the present processing ends.

In S1510, the reservation scan application 131 on the client terminal 130 transmits a reservation scan request to the MFP 100. The process of S1510 corresponds to the process of S603 in FIG. 6 and FIG. 13. In the MFP 100, confirmation (pre-transmission confirmation) is performed as to whether or not transmission to the specified transmission destination of the scanned image is possible based on the request for reservation scan received from the client terminals 130, and the client terminals 13 is notified about the confirmation result as a response to the request for reservation scan. The reservation scan application 131 on the client terminal 130 receives a response to the reservation scan request from the MFP 100. In S1511, the reservation scan application 131 on the client terminal 130 displays a screen indicating the result of the reservation scan request based on the response from the MFP 100. For example, when the request for reservation scan is successful, that is, when it is determined that transmission is possible in the pre-transmission confirmation in the MFP 100, the reservation scan application 131 displays the result screen as shown in FIG. 10. In contrast, if the request for reservation scan has failed, that is, if it is determined that transmission is not possible in the pre-transmission confirmation in the MFP 100, the reservation scan application 131 displays the result screen as shown in FIG. 14. When the result screen is displayed, the reservation scan application 131 on the client terminal 130 ends the present processing.

Figure 17:
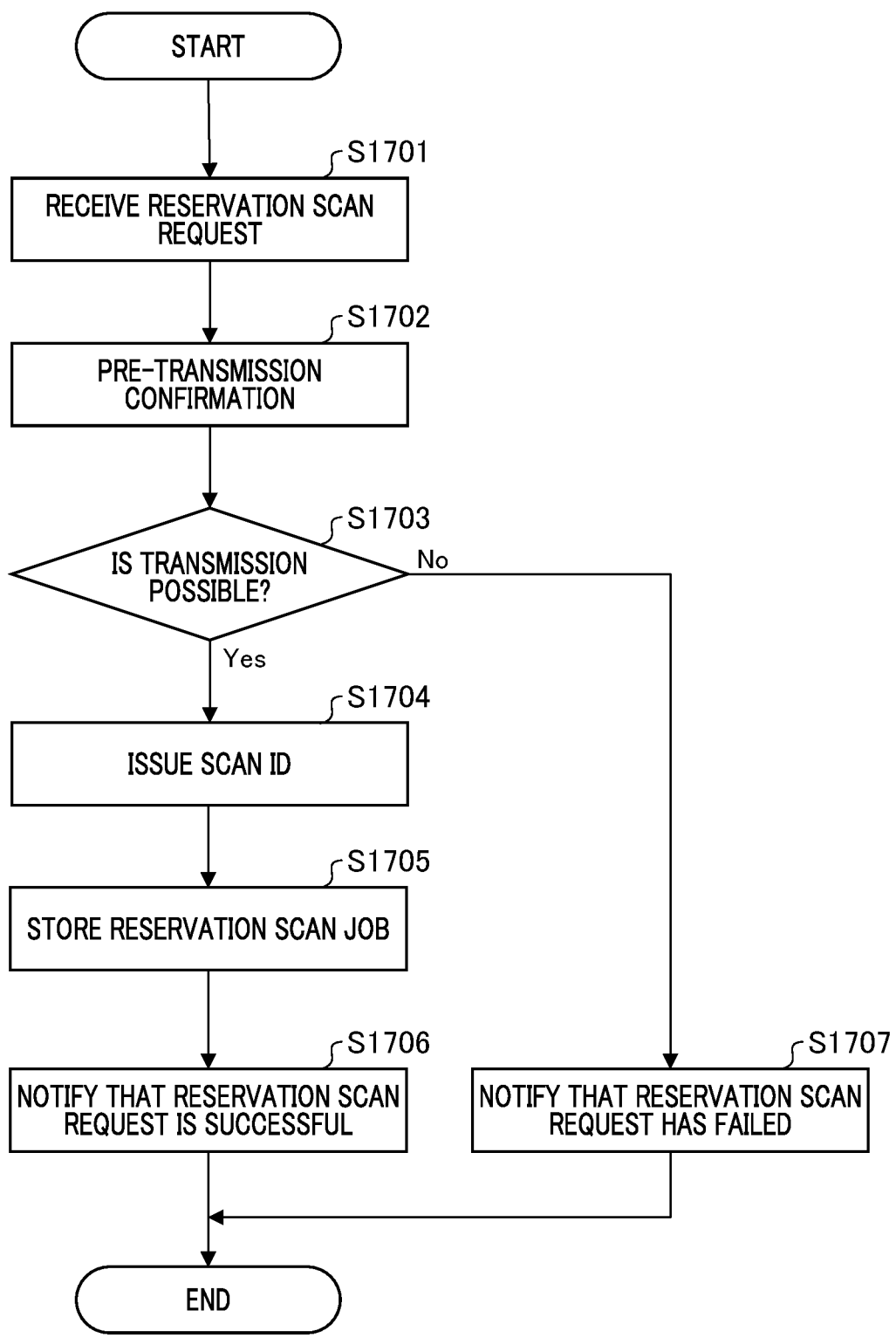
FIG. 17 is a flow chart showing the processing of an MFP that has received a reservation scan request according to the first embodiment.

FIG. 17 is a flowchart illustrating the processing of the MFP 100 that has received the reservation scan request. Each process executed in the MFP 100 as shown in FIG. 17 is realized by the CPU 201 reading a program stored in the FlashROM 210 into the DRAM 202, and executing the program.

In S1701, the reservation scan control unit 508 in the MFP 100 receives a reservation scan request from the client terminal 130. In S1702, the reservation scan control unit 508 in the MFP 100 refers to the settings included in the reservation scan request, and performs confirmation (pre-transmission confirmation) of whether or not transmission of the scanned image to the specified transmission destination is possible. Examples of the pre-transmission confirmation include a connection confirmation of whether or not the MFP 100 can access the storage server at the transmission destination and a confirmation of whether or not the network policy applied to the MFP 100 permits access to the storage server at the transmission destination. These are simply examples, and other confirmation methods may be used. The process of S1702 corresponds to the process of S604 in FIG. 6 and FIG. 13.

In S1703, the reservation scan control unit 508 in the MFP 100 determines whether or not transmission of the result of the pre-transmission confirmation in S1702 is possible. When it is determined that transmission is possible, the process of S1704 is performed. In contrast, when it is determined that the transmission is not possible, the process of S1706 is performed. In S1704, the reservation scan control unit 508 in the MFP 100 issues a scan ID corresponding to the reservation scan request that has been received in S1701. The process of S1704 corresponds to the process of S605 in FIG. 6. In S1705, the reservation scan control unit 508 in the MFP 100 stores reservation scan job settings corresponding to the reservation scan request that has been received from the client terminals 130 in S1701. The reservation scan control unit 508 stores the reservation scan job settings in the storage device 106 based on the reservation scan jobs and the access tokens acquired from the client terminals 130 in S1701, and the scan ID issued in S1704. The process of S1705 corresponds to the process of S606 in FIG. 6. In S1706, the reservation scan control unit 508 in the MFP 100 notifies the client terminals 130 that the reservation scan request that has received in S1701 is successful. The notification contents include the scan ID that has been issued in S1704. The process of S1706 corresponds to the process of S607 in FIG. 6. Thus, the reservation scan control unit 508 in the MFP 100 issues the scan ID corresponding to the reservation scan job and provides a notification about the scan ID to the client terminal 130 based on the confirmation that transmission to the transmission destination is possible in the pre-transmission confirmation.

In S1707, the reservation scan control unit 508 in the MFP 100 notifies the client terminals 130 that the reservation scan request received in S1701 has failed. At this time, the notification content may include the cause of failure in the pre-transmission confirmation. The causes of the failure in the pre-transmission confirmation include the case in which the network policy applied to the MFP 100 rejects an access to the storage server at the transmission destination, and the like. The process of S1707 corresponds to the process of S1301 in FIG. 13. The reservation scan control unit 508 in the MFP 100 completes the notification of the success or failure of the reservation scan request to the client terminal 130 based on whether or not the scanned image can be transmitted to the transmission destination of the scanned image that has been specified in S1706 or S1707, and the present process ends. Thus, the reservation scan control unit 508 in the MFP 100 provides a notification about the confirmation result to the client terminals 130 in response to the confirmation that the transmission to the transmission destination is not possible in the pre-transmission confirmation. As explained above, when it is confirmed that the transmission to the transmission destination is possible based on the confirmation result in the pre-transmission confirmation, the MFP 100 transmits the scan ID corresponding to the reservation scan job to the client terminal 130, and if it is confirmed that the transmission to the transmission destination is not possible, the MFP 100 transmits the confirmation result to the client terminal 130.

Figure 18:
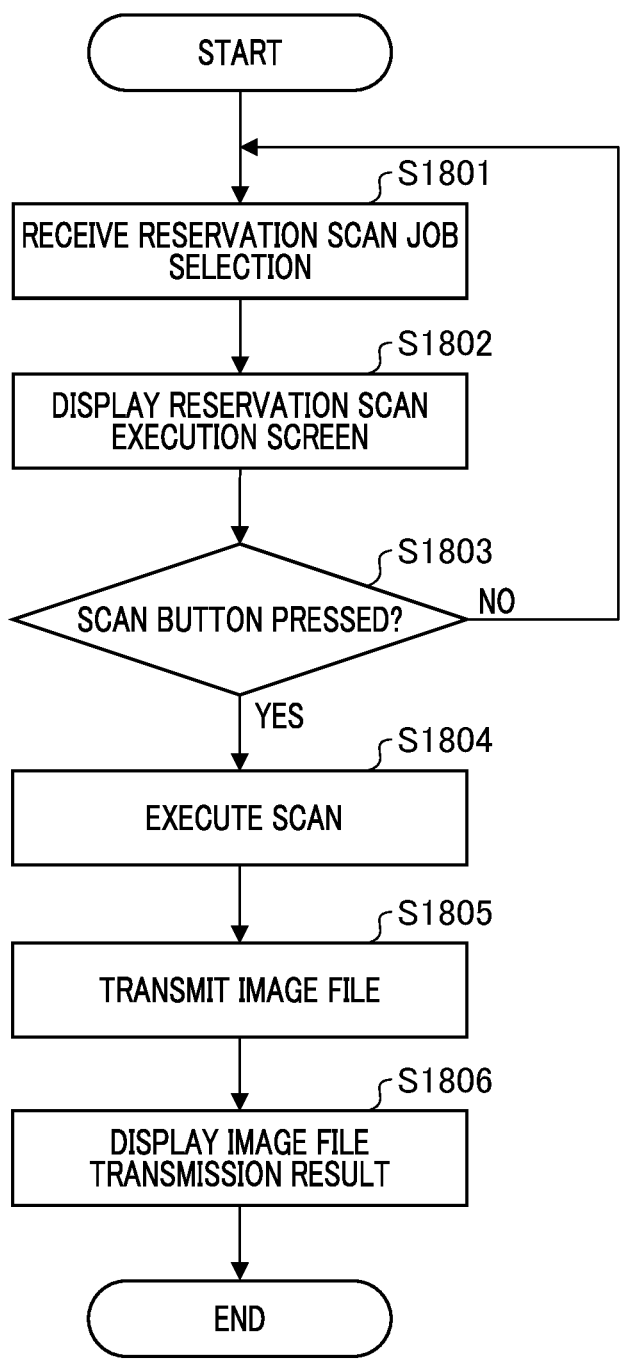
FIG. 18 is a flow chart showing the processing of a reservation scan in the MFP according to the first embodiment.

FIG. 18 is a flow chart showing the reservation scan processing in the MFP 100. Each process executed by the MFP 100 as shown in FIG. 18 is realized by the CPU 201 reading a program that is stored in the FlashROM 210 into the DRAM 202, and executing the program.

This processing is started when the reservation scan application 105 is activated by a user operation in the MFP 100 (S609). In S1801, the reservation scan control unit 508 in the MFP 100 displays a list of reservation scan jobs (FIG. 11) on the operation unit 102, and receives a selection of reservation scan jobs to be executed from the user. The process of S1801 corresponds to the process of S601 in FIG. 7. In S1802, the reservation scan control unit 508 in the MFP 100 displays the execution screen (FIG. 12) of the reservation scan job selected in S1801 on the operation unit 102. Note that the reservation scan execution screen 1200 illustrated in FIG. 12 is simply an example, and for example, a button that enables changing the setting of the reservation scan job may be prepared. The process of S1802 corresponds to the process of S611 in FIG. 7.

In S1803, the reservation scan control unit 508 in the MFP 100 determines whether or not pressing of the scan execution button 1205 on the reservation scan execution screen 1200 by the user has been detected. When the scan execution button 1205 is pressed, the process of S1804 is performed. In contrast, if the scan execution button 1205 is not pressed and the return button 1206 is pressed, the process returns to S1801. In S1804, the reservation scan control unit 508 in the MFP 100 executes a scan with the settings displayed in the S1802 based on the reservation scan job. The process of S1804 corresponds to the process of S612 in FIG. 7. In S1805, the reservation scan control unit 508 in the MFP 100 transmits the image file generated by the scan to the transmission destination specified by the reservation scan job. In the present embodiment, the image file is transmitted to the storage server 120. The process of S1805 corresponds to the process of S613 in FIG. 7. In S1806, the reservation scan control unit 508 in the MFP 100 displays the transmission result of the image file. The process of S1806 corresponds to the process of S602 in FIG. 7. When the display of the transmission result is completed, the MFP 100 ends this processing.

Although, in the present embodiment, an example has been described in which the pre-transmission confirmation is performed at the timing when the request for the reservation scan is received from the client terminal 130, the present invention is not limited thereto. For example, a confirmation may be adopted in which the pre-transmission confirmation is performed for a single destination or a plurality of destinations (transmission destinations) before the reservation scan job is executed, after the reservation scan job is stored in the MFP 100. For example, the MFP 100 may be instructed to execute the pre-transmission confirmation again by specifying the reservation scan job that cannot be transmitted in the previous pre-transmission confirmation from the client terminal 130 and the like, and the pre-transmission confirmation may be executed in the MFP 100. The specification of the reservation scan job can be performed by, for example, specifying the scan ID. Additionally, the MFP 100 can collectively confirm whether or not the transmission to the transmission destination included in the reservation scan job stored in the storage device 106 is possible. The timing at which this pre-transmission confirmation is executed may be the timing at which an instruction is issued from a screen displayed on the MFP 100 as shown in FIG. 11 and FIG. 12, or the timing at which an instruction is issued from an external device, for example, the client device 130 that is connected to the network. Additionally, the pre-transmission confirmation may be periodically and automatically performed in the MFP 100. Additionally, instead of performing the pre-transmission confirmation to all the transmission destinations, only the transmission destinations for which it has been confirmed that the transmission is not possible in the previous pre-transmission confirmation may collectively be confirmed. Although, in the present embodiment, the mechanism of OAuth is assumed, a configuration using another authentication method may be adopted.

As explained above, according to the present embodiment, before an image processing apparatus executes a reservation scan job, verification of whether or not the transmission of the job is successful is possible. As a result, it is possible to suppress the occurrence of unnecessary work for the user, which is caused by transmission errors during execution of the reservation scan job.

Second Embodiment

In the first embodiment, whether or not the transmission of the image generated by the reservation scan is successful is verified at the timing after the client terminal transmits the reservation scan request to the MFP and before the MFP executes the reservation scan. In the second embodiment, verification of whether or not the transmission of an image generated by reservation scan is successful is performed before the client terminal performs a reservation scan request to the MFP. The configuration of the system in the present embodiment is similar to that in the first embodiment. In the present embodiment, the explanation regarding the configuration and processes that are similar to the first embodiment will be omitted by providing the same reference numerals.

An outline of the reservation scanning operation in the second embodiment will be explained with reference to FIG. 19 to FIG. 25. In the second embodiment, a process of confirming whether or not the scanned image can be transmitted to the specified transmission destination in the MFP 100 is performed before the reservation scan job is received from the client terminal 130.

Figure 19:
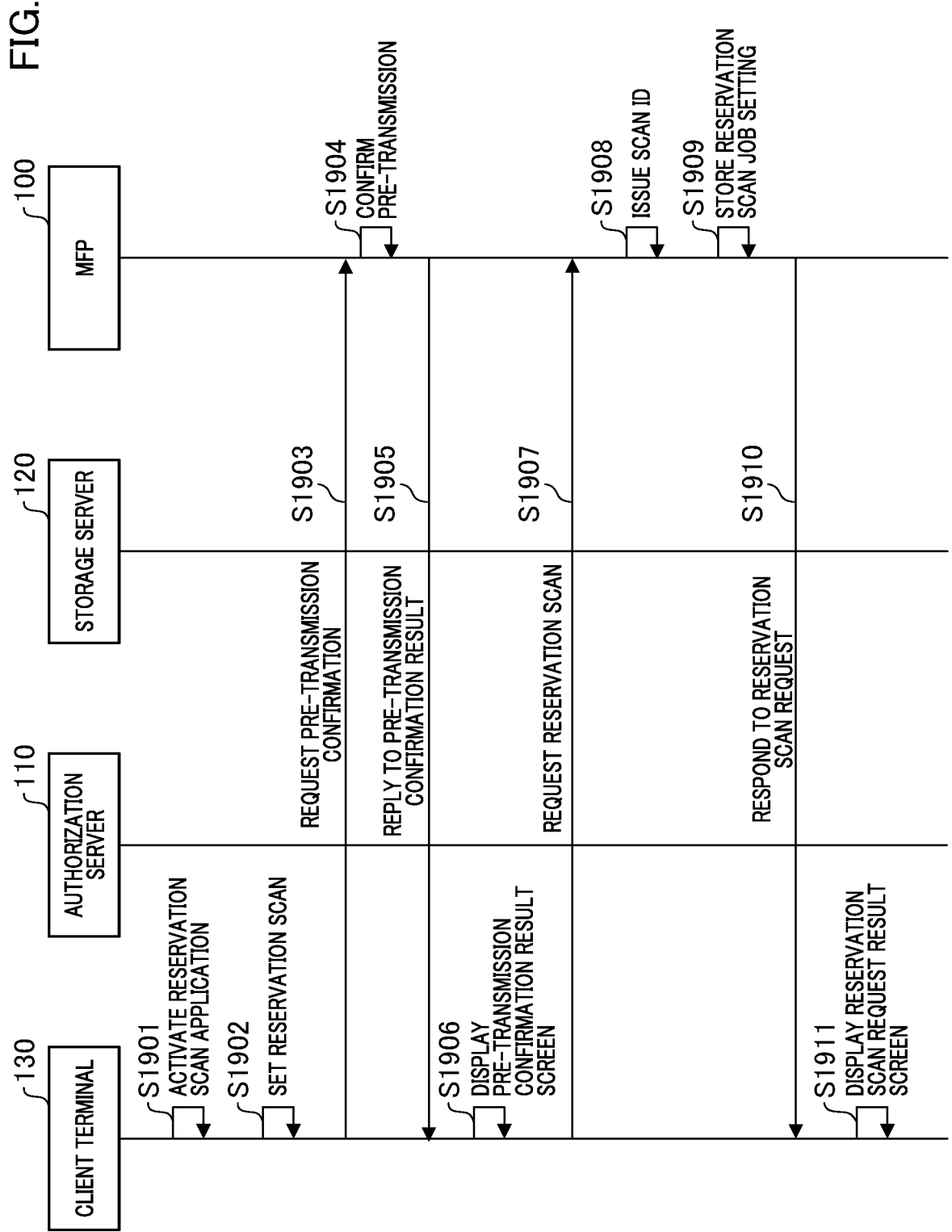
FIG. 19 is a sequence diagram explaining the flow of a series of reservation scan processes in the second embodiment.
Figure 20:
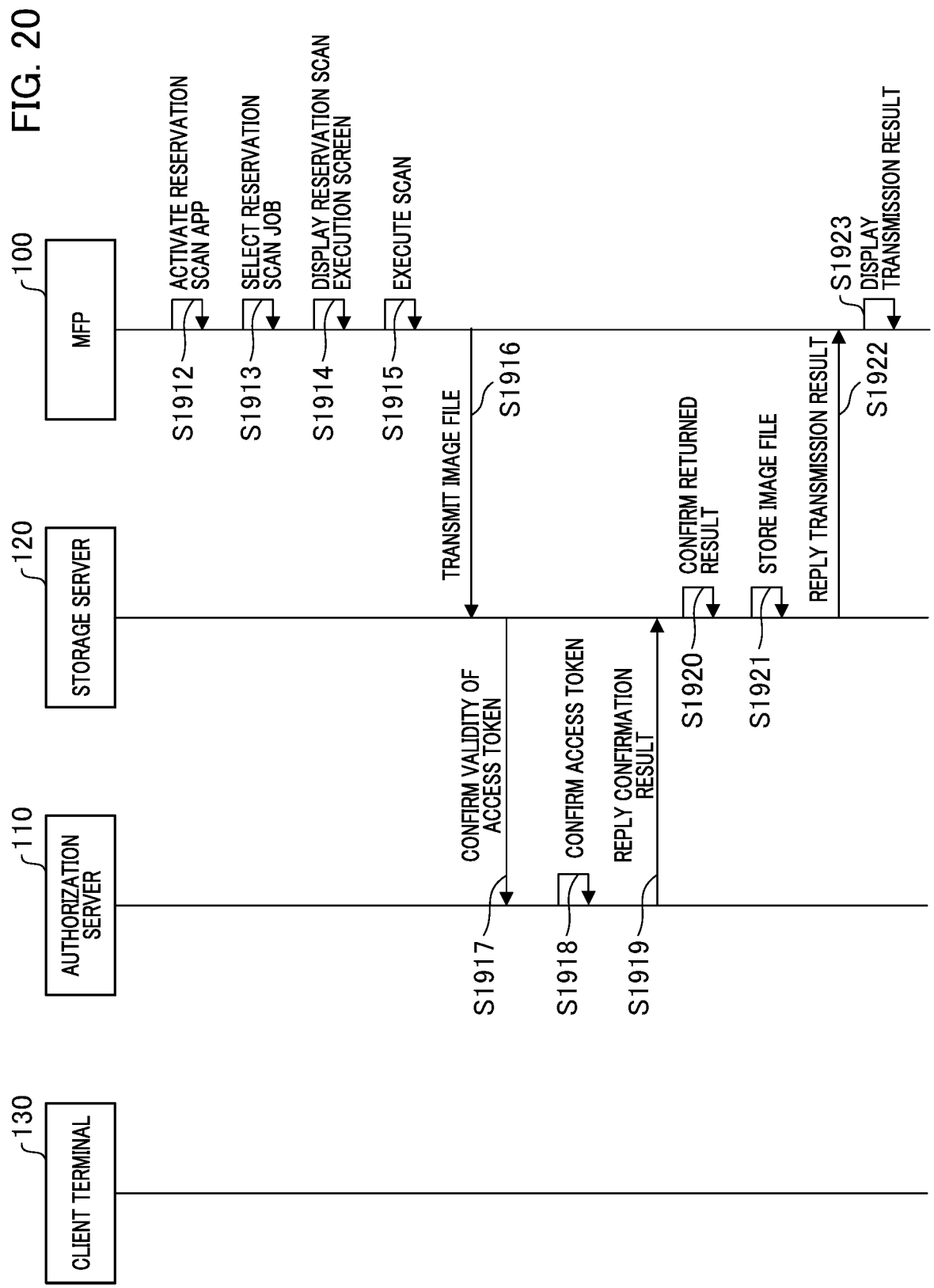
FIG. 20 is a sequence diagram explaining the flow of a series of the reservation scan processes in the second embodiment.

FIGS. 19 and 20 are sequence diagrams that explain a the flows of a series of the reservation scan processing according to the second embodiment. In the present embodiment, each process executed by the MFP 100 as shown in FIG. 19 and FIG. 20 is realized by the CPU 201 reading a program stored in the FlashROM 210 into the DRAM 202 and executing the program. Each process executed by the authorization server 110 and the storage server 120 as shown in FIG. 19 and FIG. 20 is realized by the CPU 301 reading a program stored in the HDD 306 into the DRAM 302, and executing the program. Each of the processes executed by the client terminals 130 as shown in FIGS. 19 and 20 is realized by the CPU 401 reading a program stored in the FlashROM 406 into the DRAM 402, and executing the program.

The reservation scan application 131 on the client terminal 130 activated in S1901 displays a screen for setting the reservation scan in S1902, and receives the setting of the reservation scan requested to the MFP 100. S1901 and S1902 are processes similar to S601 and S602. Note that a button for confirming whether or not an image can be transmitted from the MFP 100 to the specified transmission destination of the scan image (pre-transmission confirmation) is displayed on the reservation scan setting screen that is displayed in the second embodiment.

Figure 21:
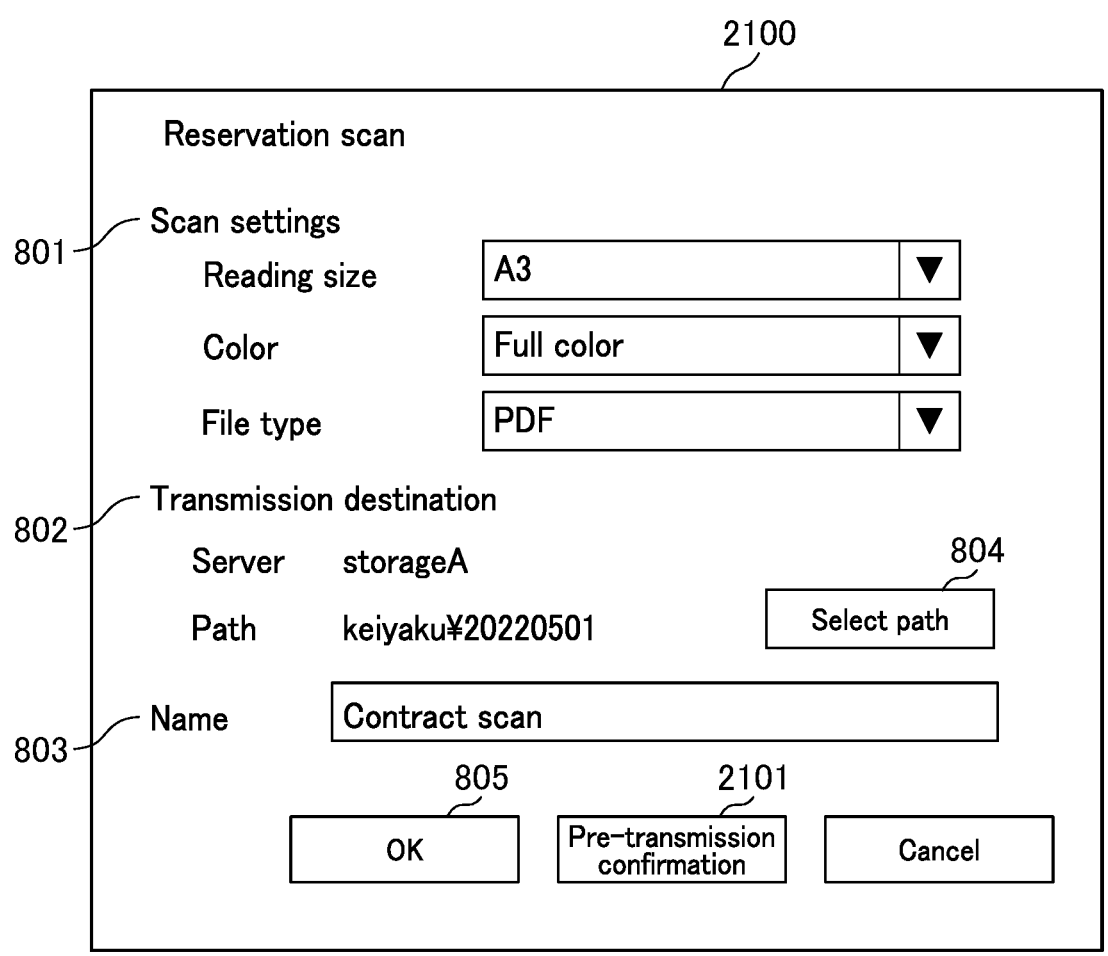
FIG. 21 is a diagram showing an example of a reservation scan setting screen in the second embodiment.

FIG. 21 is a diagram illustrating an example of a reservation scan setting screen according to the second embodiment. For example, a pre-transmission confirmation button 2101 is displayed on a reservation scan setting screen 2100, in addition to the scan settings 801, the transmission destination 802, the name 803, the path selection button 804, the OK button 805, and the like that are also displayed on the reservation scan setting screen 800 in the first embodiment. The reservation scan setting screen 2100 is displayed on the screen of the client terminal 130 by the reservation scan application 131. The pre-transmission confirmation button 2101 is a button for instructing the MFP 100 to perform pre-transmission confirmation. When the pre-transmission confirmation button 2101 is pressed, the reservation scan application 131 of the client 130 requests the MFP 100 to confirm whether or not the scanned image can be transmitted to the transmission destination set in the transmission destination 802. In addition to confirming whether or not transmission to the destination is possible, the MFP 100 may be requested to confirm whether or not scanning can be performed with the current scan settings 801.

When the client terminal 130 detects that the pre-transmission confirmation button 2101 has been pressed, in S1903, the reservation scan application 131 of the client terminal 130 requests the MFP 100 to perform the pre-transmission confirmation. When the pre-transmission confirmation is requested, the reservation scan application 131 of the client terminal 130 transmits the current scan settings including the transmission destination to the MFP 100. When the request for the pre-transmission confirmation is received from the client device 130, in S1904, the reservation scan control unit 508 in the MFP 100 performs the pre-transmission confirmation based on the settings of the reservation scan that have been acquired from the client device 130. In the pre-transmission confirmation, the reservation scan control unit 508 refers to the settings of the reservation scan that have been received from the client terminal 130 to confirm whether or not the transmission to the specified transmission destination of the scanned image is possible. What is confirmed in the pre-transmission confirmation is, for example, whether or not the MFP 100 can access the storage server 120 at the transmission destination, and whether or not the network policy applied to the MFP 100 permits an access to the storage server 120 at the transmission destination. Note that the confirmation content is not limited thereto, and another confirmation method may be used.

In S1905, the reservation scan control unit 508 in the MFP 100 responds to the client terminals 130 with the result of the pre-transmission confirmation. For example, when it is confirmed that the scanned image can be transmitted to the specified transmission destination, a response indicating that the pre-transmission confirmation is successful is transmitted to the client terminal 130. In contrast, if it is confirmed that the scanned image cannot be transmitted to the specified transmission destination, a response indicating that the pre-transmission confirmation has failed is transmitted to the client terminal 130.

Figure 22A:
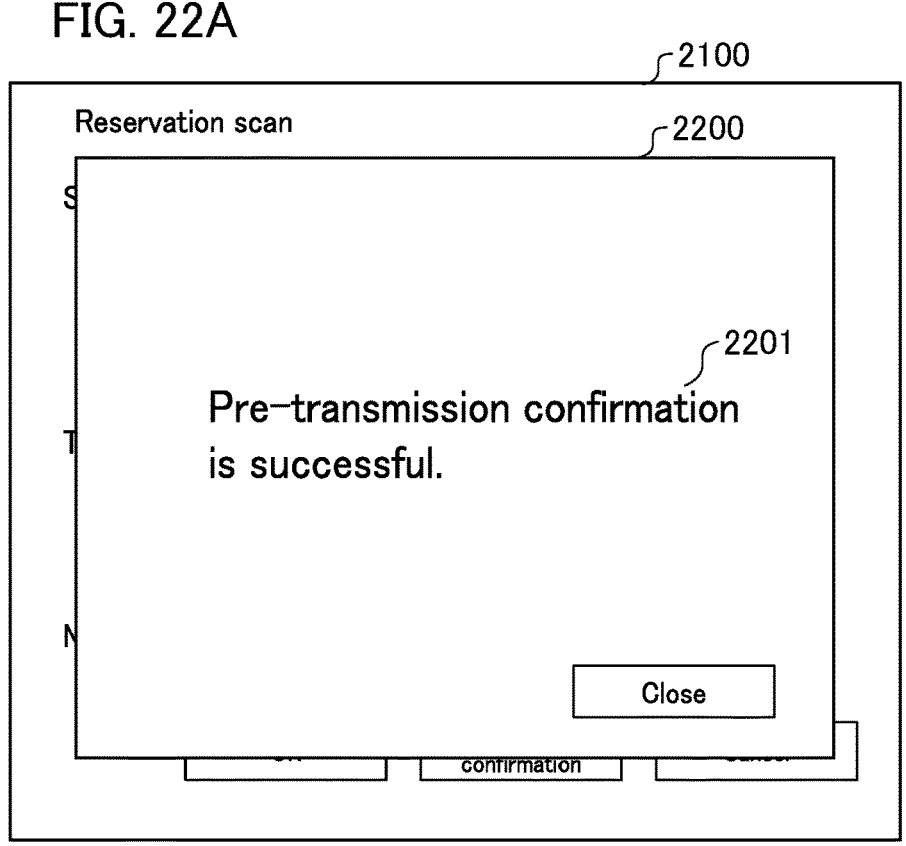
FIGS. 22A and 22B are diagrams showing an example of a pre-transmission confirmation result screen in the second embodiment.
Figure 22B:
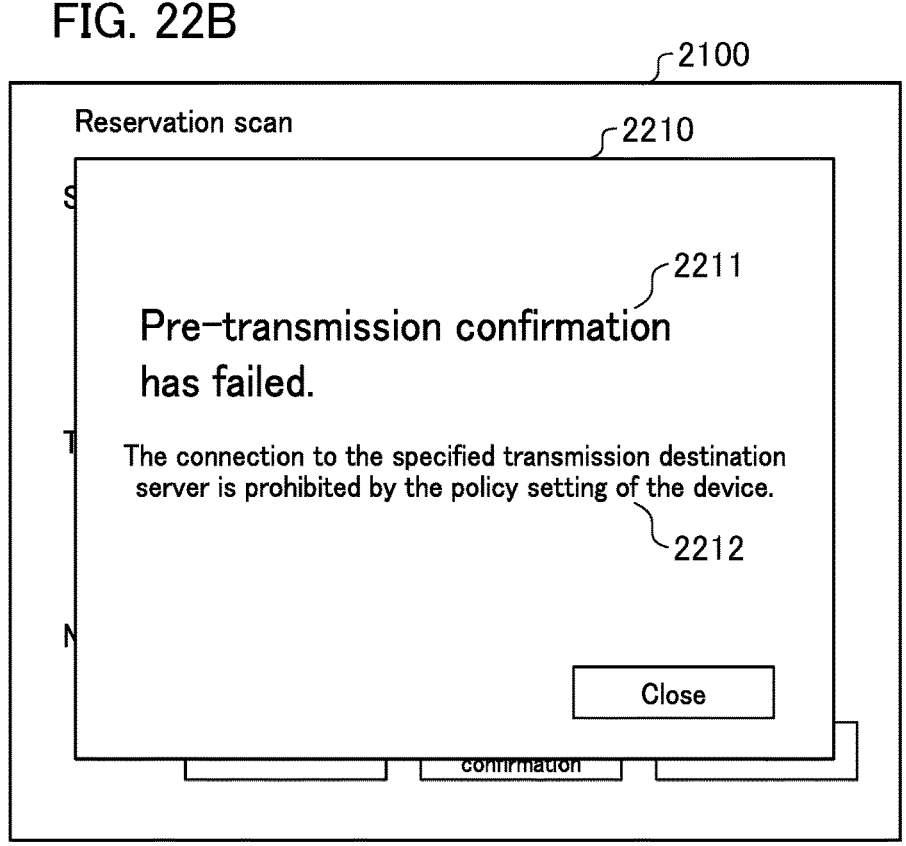

In S1906, the reservation scan application 131 on the client terminal 130 displays the result of the pre-transmission confirmation that has been received in S1905. FIGS. 22A and 22B are diagrams showing an example of a pre-transmission confirmation result screen in the second embodiment. FIG. 22A is an example of a result screen 2200 in a case in which the result of the pre-transmission confirmation is successful. For example, the result screen 2200 is superimposed and displayed on the reservation scan setting screen 2100. On the result screen 2200, for example, a message 2201 indicating that the pre-transmission confirmation is successful is displayed. Additionally, a response code and the like when the storage server at the transmission destination is accessed may be displayed on the result screen 2200. FIG. 22B is an example of a result screen 2210 in a case in which the result of the pre-transmission confirmation is a failure. The result screen 2210 is superimposed and displayed, for example, on the reservation scan setting screen 2100. On the result screen 2210, for example, a message 2211 indicating that the pre-transmission confirmation has failed and a reason 2212 why the transmission is not possible are displayed. Additionally, a screen showing how to handle errors causing transmission not being possible or a screen on which transmission destination setting can be changed may be displayed on the result screen 2210. The user who has confirmed the connection result can change the settings of the reservation scan job and can change the settings of the MFP 100 according to necessity. For example, it is also possible to change the setting of the transmission destination and perform the pre-transmission confirmation again.

The following processes are executed when the pre-transmission confirmation is successful. In S1907, the reservation scan application 131 of the client terminal 130 requests the reservation scan to the MFP 100 upon detecting that the OK button 805 of the reservation scan setting screen 2100 has been pressed. In the reservation scan request, the client terminal 130 transmits, to the MFP 100, a reservation scan job generated based on the setting in the S602 and an access token for using the storage 122 serving as a storage destination authorized by the user. The access token is a token that has been obtained from an authentication service that is provided by the authorization server 110.

S1908 and S1909 are processes similar to S605 and S606 in the first embodiment. In S1910, the reservation scan control unit 508 in the MFP 100 performs a response to the reservation scan request in S1907 to the client terminals 130. The response includes a scan ID corresponding to the reservation scan request that has been issued in S1908. In S1911, the reservation scan application 131 of the client 130 displays the result of the reservation scan request that has been requested to the MFP 100 in S603 on the display of the client 130, based on the response that has been acquired from the MFP 100 in S607. For example, the reservation scan application 131 displays the result screen 1000 including the scan ID 1002 that has been issued in the MFP 100 as shown in FIG. 10. The processes from S1912 to S1923 in which the user selects and executes the reservation scan job reserved in the MFP 100 are similar to the processes from S609 to S620 in the first embodiment. Note that although, in the present embodiment, the mechanism of OAuth is assumed, a configuration using another authentication method may be adopted.

Figure 23:
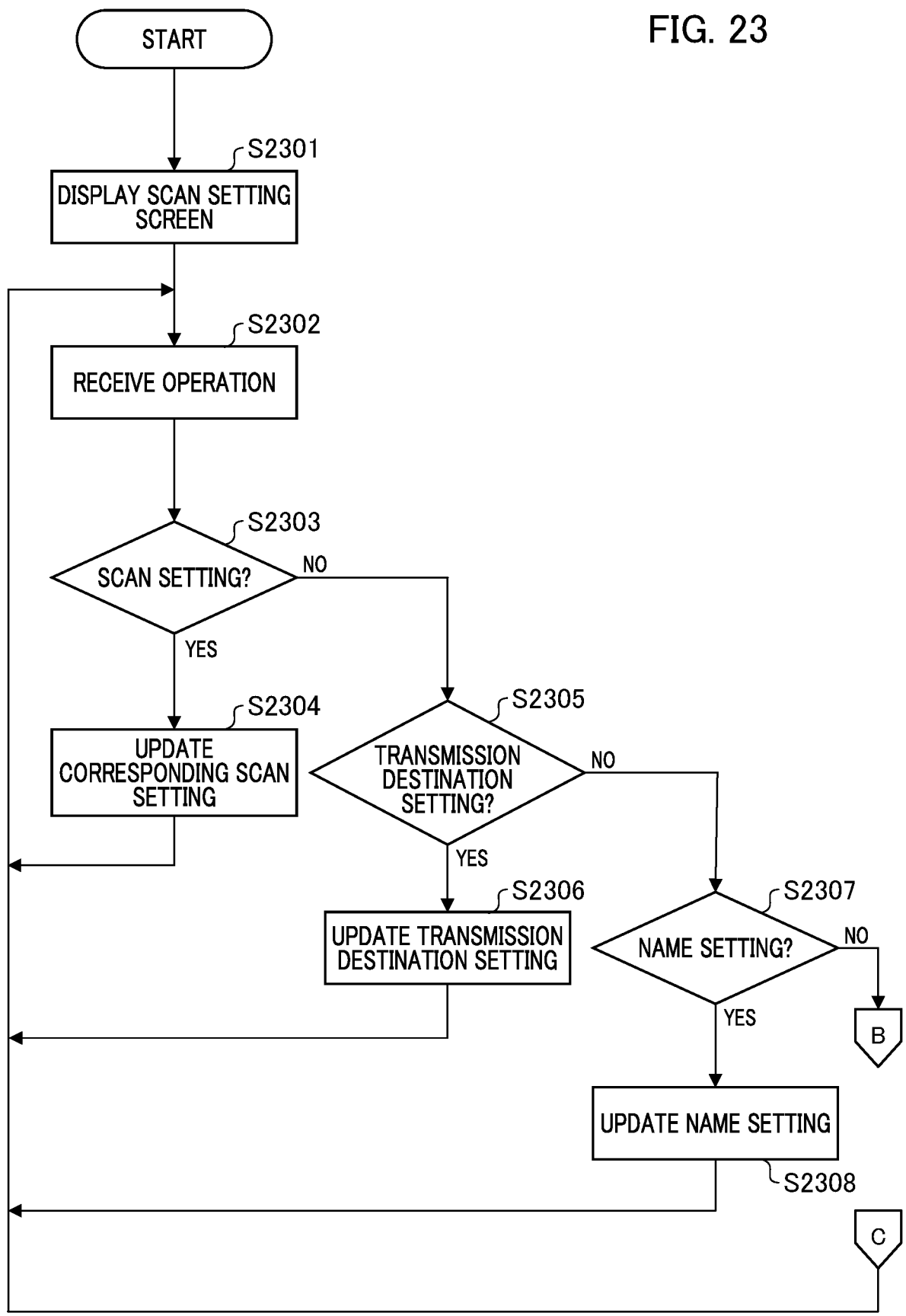
FIG. 23 is a flow chart showing the reservation scan processing in the client terminal according to the second embodiment.
Figure 24:
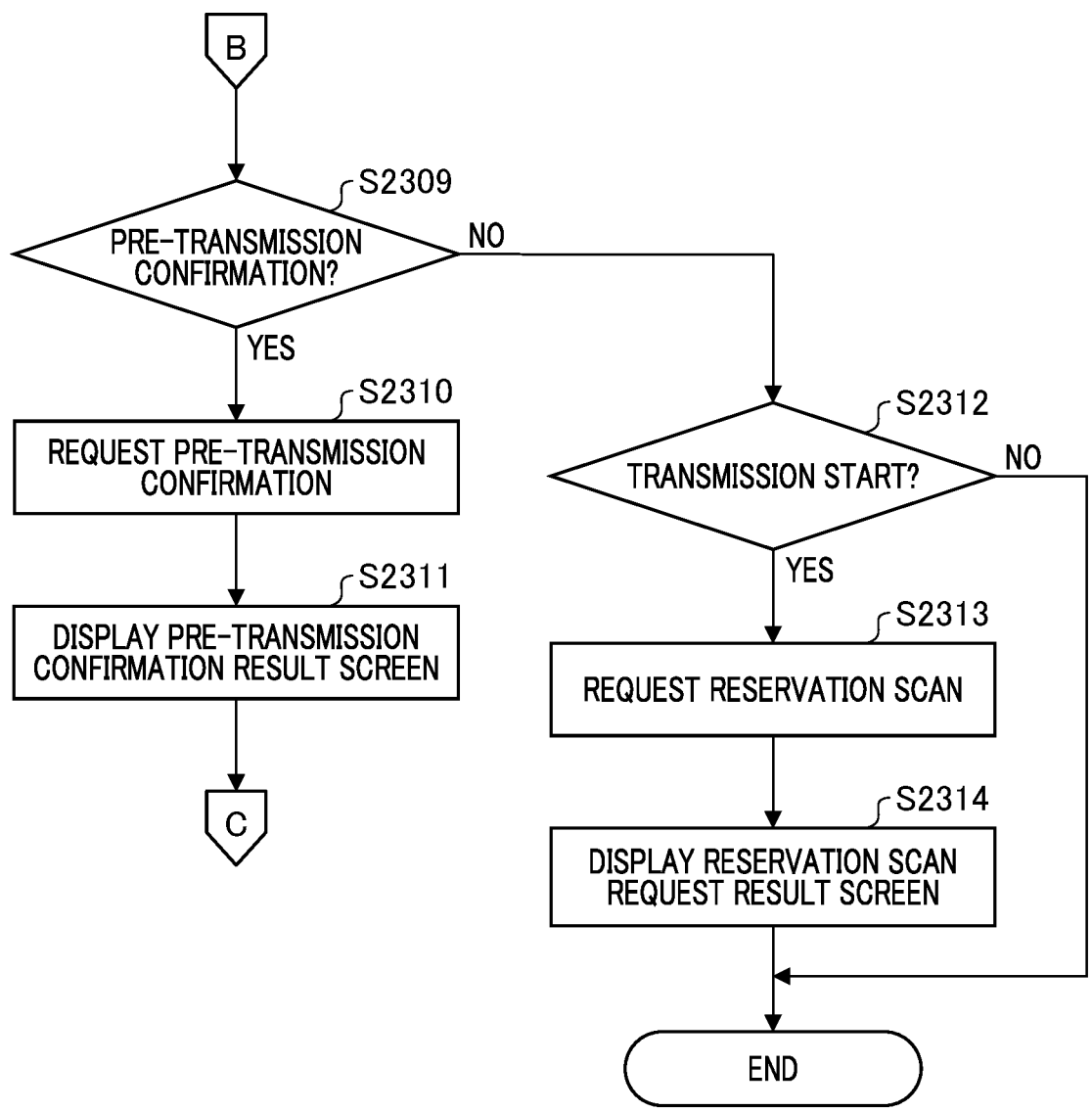
FIG. 24 is a flow chart showing the reservation scan processing in the client terminal according to the second embodiment.

FIG. 23 and FIG. 24 are flowcharts illustrating the reservation scan processing in the reservation scan application 131 of the client terminal 130. Each process executed by the client terminals 130 and shown in FIG. 23 and FIG. 24 is realized by the CPU 401 reading a program stored in the FlashROM 406 into the DRAM 402, and executing the program.

This processing starts when the user selects the reservation scan application 131 to start the setting of the reservation scan on the client terminal 130, and the reservation scan application 131 is activated. In S2301, the reservation scan application 131 of the client terminal 130 displays the reservation scan setting screen 2100 (FIG. 21). The process of S2101 corresponds to the process of S1901 in FIG. 19. In S2302, the reservation scan application 131 of the client terminal 130 receives (detects) a user operation on the reservation scan setting screen 800. Examples of the operation to be received include an operation of changing the settings of the scan settings 801, the transmission destination 802, and the name 803, a transmission start of a reservation scan job by pressing the OK button 805, and a pre-transmission confirmation request by pressing the pre-transmission confirmation button 2101. The processes from S2303 to S2308 are similar to the processes from S1503 to S1508 in the first embodiment.

When the operation received in S2302 is neither of the scan setting, the transmission destination setting, nor the name setting, in S2309, the reservation scan application 131 of the client terminal 130 determines whether or not the operation that has been received in S2302 is the pre-transmission confirmation. When the received operation is the pre-transmission confirmation, the process of S2310 is performed. In contrast, when the received operation is not the pre-transmission confirmation, the process of S2312 is performed. In S2310, the reservation scan application 131 of the client terminal 130 requests the MFP 100 to perform the pre-transmission confirmation with the reservation scan settings that are currently specified on the reservation scan setting screen 2100, and receives the result of the pre-transmission confirmation from the MFP 100. In S2311, the reservation scan application 131 on the client device 130 displays the result of the pre-transmission confirmation on the screen based on the response of the pre-transmission confirmation result from the MFP 100. For example, when the pre-transmission confirmation is successful, the result screen as shown in FIG. 22A is displayed, and when the pre-transmission confirmation has failed, the result screen as shown in FIG. 22B is displayed. When the display of the pre-transmission confirmation result is completed, the process returns to S2302.

In S2312, the reservation scan application 131 on the client terminal 130 determines whether or not the operation received in S2302 is a transmission start. When the operation is the transmission start, the process of S2313 is performed. In contrast, if the operation is not the transmission start, the process ends. In S2313, the reservation scan application 131 on the client terminal 130 requests a reservation scan to the MFP 100 and receives a response to the request. In S2314, the reservation scan application 131 on the client terminal 130 displays a screen showing the result of the reservation scan request based on the response from the MFP 100. For example, when the reservation scan request is successful, the screen of FIG. 10 is displayed. When the display of the result of the reservation scan request is completed, the process ends.

Figure 25:
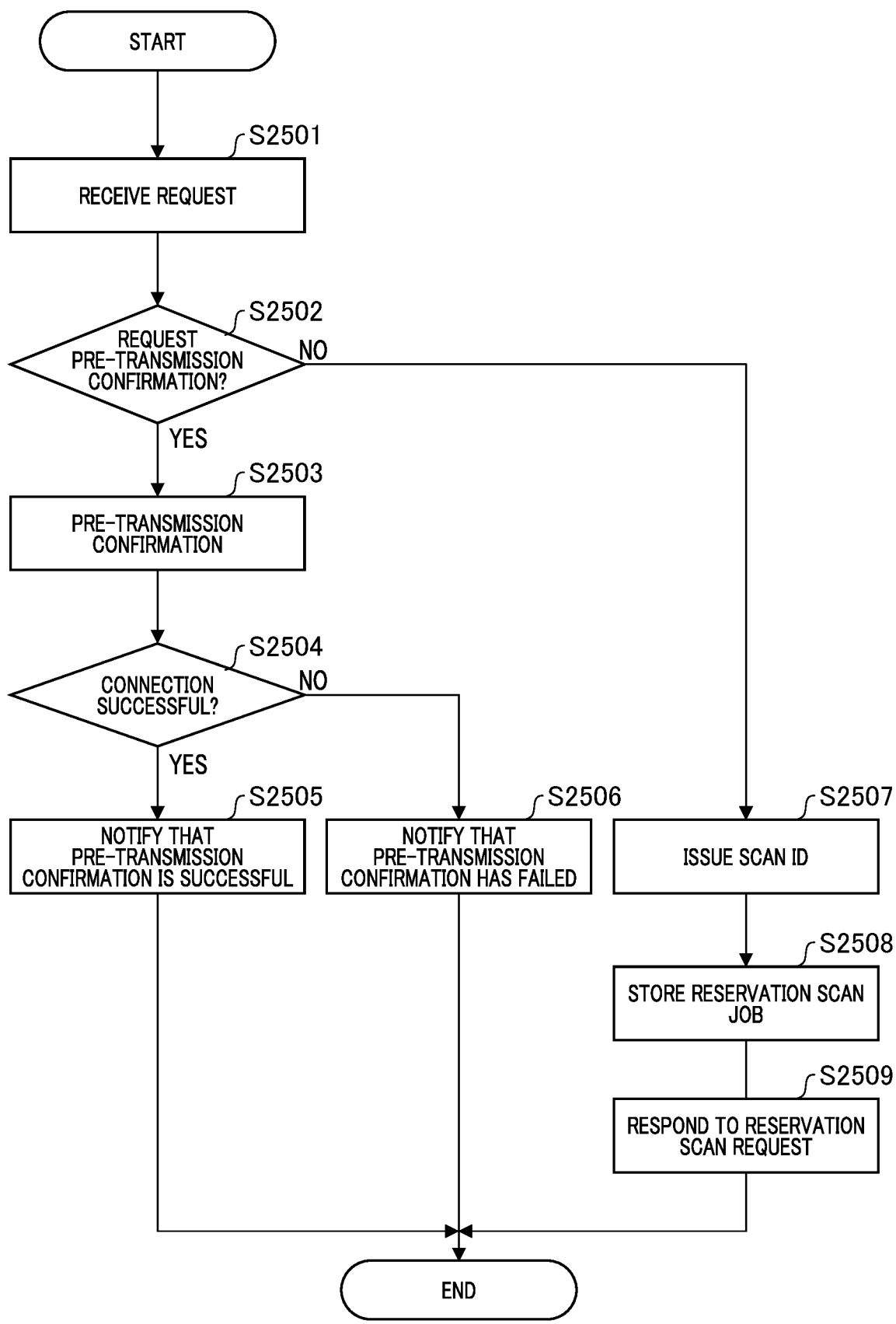
FIG. 25 is a flow chart showing the MFP processing that has received a request according to the second embodiment.

FIG. 25 is a flowchart showing the processing of the MFP 100 in response to a request from the client 130. Here, the request that the MFP 100 receives from the client terminals 130 is a pre-transmission confirmation request or a reservation scan request. Each process executed by the MFP 100 as shown in FIG. 25 is realized by the CPU 201 reading a program stored in the FlashROM 210 into the DRAM 202, and executing the program.

In S2501, the reservation scan control unit 508 in the MFP 100 receives a request from the client terminals 130. In S2502, the reservation scan control unit 508 in the MFP 100 determines whether or not the request that has been received from the client terminals 130 in S2501 is a pre-transmission confirmation request. When the received request is a pre-transmission confirmation request, the process of S2503 is performed. In contrast, if the received request is not the pre-transmission confirmation request, that is, when the received request is a reservation scan request, the process of S2507 is performed.

In S2503, the reservation scan control unit 508 in the MFP 100 performs a confirmation of whether or not the scanned image can be transmitted to the specified transmission destination of the scanned image (pre-transmission confirmation) based on the reservation scan settings included in the pre-transmission confirmation request. Examples of the pre-transmission confirmation include a connection confirmation of whether or not the MFP 100 can access the storage server at the transmission destination and a confirmation of whether or not the network policy applied to the MFP 100 permits an access to the storage server at the transmission destination. These are simply examples, and other confirmation methods may be used.

In S2504, the reservation scan control unit 508 in the MFP 100 determines whether or not the pre-transmission confirmation in S2503 is successful. When the pre-transmission confirmation is successful, that is, when it is determined in the pre-transmission confirmation that transmission is possible, the process of S2505 is performed. In contrast, if the pre-transmission confirmation has failed, that is, if it is determined that transmission is not possible in the pre-transmission confirmation, the process of S2506 is performed. In S2505, the reservation scan control unit 508 in the MFP 100 provides a notification about the success of the pre-transmission confirmation to the client terminals 130. In S2506, the reservation scan control unit 508 in the MFP 100 provides a notification about the failure of the pre-transmission confirmation to the client terminals 130.

In S2507, the reservation scan control unit 508 in the MFP 100 issues a scan ID corresponding to the reservation scan request that has been received in S2501. Note that the MFP 100 may perform a pre-transmission confirmation based on the settings included in the reservation scan request before issuing a scan ID, and may switch whether or not to issue the scan ID according to the confirmation result. If it is determined in the pre-transmission confirmation that transmission is not possible and no scan IDs are issued, the MFP 100 provides a notification that the reservation scan request that has been received in S2501 has failed to the client terminals 130.

In S2508, the reservation scan control unit 508 in the MFP 100 stores reservation scan job settings corresponding to the reservation scan request that has been received from the client terminal 130. The reservation scan control unit 508 stores the reservation scan job settings in the storage device 106, based on the reservation scan jobs and the access tokens that have been acquired from the client terminals 130 in S2501, and the scan IDs issued in S2507. In S2509, the reservation scan control unit 508 in the MFP 100 provides a notification about the result of the reservation scan request that has been received in S2501 to the client terminals 130. In the case in which a notification that the reservation scan request is successful is provided, the notification contents include the scan ID issued in S2507. In a case in which a notification that the reservation scan request has failed is provided, the cause of the failure of the pre-transmission confirmation may be included in the notification content.

As described above, according to the second embodiment, it is possible to confirm whether or not the transmission of the scanned image to the image processing apparatus is successful during the setting of the reservation scan job in the client terminal before the client terminal transmits the reservation scan job to the image processing apparatus. In the present embodiment, pre-transmission confirmation can be performed while the setting screen is open, and if transmission is not possible, the transmission destination can be changed immediately on the setting screen. As a result, it is possible to suppress the occurrence of unnecessary work for the user, which is caused by transmission errors during execution of the reservation scan job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-153144, filed Sep. 26, 2022, which is hereby incorporated by reference wherein in its entirety.

What is claimed is:

1. An image processing apparatus comprising:
a storage device;
a scanner;
a memory storing instructions; and
a processor executing the instructions causing the image processing apparatus to:
confirm whether or not a file including an image generated by scan processing executed by the scanner can be transmitted to a transmission destination specified by a client terminal;
provide a notification about a confirmation result to the client terminal in response to a confirmation that transmission to a first transmission destination specified by the client terminal is not possible;
store, in the storage device, a job including a setting of scan processing and a second transmission destination specified by the client terminal; and
provide a notification about identification information corresponding to the stored job to the client terminal in response to a confirmation that transmission to the second transmission destination is possible,
wherein the instructions further cause the image processing apparatus to store, in a case in which it is confirmed that transmission to the first transmission destination is not possible, if a cause of transmission not being possible is not a predetermined cause specified in advance, a job including a setting of scan processing and the first transmission destination in the storage device, and to provide the notification about the confirmation result to the client terminal.

2. The image processing apparatus according to claim 1, wherein the instructions further cause the image processing apparatus to issue, in a case in which it is confirmed that transmission to the second transmission destination is possible, identification information corresponding to the job to be stored in the storage device, and
wherein a notification about the issued identification information is provided to the client terminal.

3. The image processing apparatus according to claim 1, wherein if an instruction to confirm whether or not an image generated by scan processing can be transmitted to a specified transmission destination is received from the client terminal, the instructions further cause the image processing apparatus to confirm whether or not transmission to the transmission destination is possible.

4. The image processing apparatus according to claim 3, wherein the instructions further cause the image processing apparatus to provide a notification about the confirmation result to the client terminal in response to a confirmation that transmission to the transmission destination is possible, and
wherein in a case in which a job including a setting of the scan processing and the transmission destination is received from the client terminal that has received the notification, the instructions further cause the image processing apparatus to issue identification information corresponding to the job, store a job including the identification information in the storage device, and provide a notification about the identification information to the client terminal.

5. The image processing apparatus according to claim 1, wherein the instructions further cause the image processing apparatus to confirm whether or not transmission to each of all transmission destinations included in one or more jobs stored in the storage device, a transmission destination in which it is determined that transmission is not possible in the previous confirmation, or a specified transmission destination is possible.

6. The image processing apparatus according to claim 1, wherein, in the client terminal, the confirmation result is displayed based on the notification that has been received from the image processing apparatus.

7. The image processing apparatus according to claim 1, wherein the instructions further cause the image processing apparatus to confirm whether or not transmission is possible based on at least one of a network setting applied to the image processing apparatus, a network policy setting applied to the image processing apparatus, and a connection to the transmission destination.

8. The image processing apparatus according to claim 1, wherein, in a case in which it is confirmed that transmission to the first transmission destination is not possible, if a cause of transmission not being possible is a predetermined cause specified in advance, the notification about the confirmation result is provided to the client terminal without storing a job about the first transmission destination in the storage device.

9. A control method of an image processing apparatus including a scanner and a storage device, the method comprising:
confirming whether or not a file including an image generated by scan processing executed by the scanner can be transmitted to a transmission destination specified by a client terminal;
providing a notification about a result of the confirmation to the client terminal in response to a confirmation that transmission to a first transmission destination specified by the client terminal is not possible;
storing, in the storage device, a job including a setting of scan processing and a second transmission destination specified by the client terminal;
providing a notification about identification information corresponding to the stored job to the client terminal in response to a confirmation that transmission to the second transmission destination is possible; and
storing, in a case in which it is confirmed that transmission to the first transmission destination is not possible, if a cause of transmission not being possible is not a predetermined cause specified in advance, a job including a setting of scan processing and the first transmission destination in the storage device, and providing the notification about the confirmation result to the client terminal.

* * * * *